(12) United States Patent
Dintner et al.

(10) Patent No.: US 12,501,127 B2
(45) Date of Patent: Dec. 16, 2025

(54) IMAGING APPARATUSES AND ENCLOSURES CONFIGURED FOR DEPLOYMENT IN CONNECTION WITH CEILINGS AND DOWNLIGHT CAVITIES

(71) Applicant: Calumino Pty Ltd., Eveleigh (AU)

(72) Inventors: Felix Dintner, Bronte (AU); Marek Steffanson, Mosman (AU)

(73) Assignee: Calumino Pty Ltd., Eveleigh (AU)

( * ) Notice: Subject to any disclaimer, the term of this patent is extended or adjusted under 35 U.S.C. 154(b) by 0 days.

(21) Appl. No.: 18/492,695

(22) Filed: Oct. 23, 2023

(65) Prior Publication Data

US 2024/0056660 A1 Feb. 15, 2024

Related U.S. Application Data

(63) Continuation of application No. 17/515,136, filed on Oct. 29, 2021, now Pat. No. 11,831,966, which is a
(Continued)

(51) Int. Cl.
*H04N 23/51* (2023.01)
*F21S 8/02* (2006.01)
(Continued)

(52) U.S. Cl.
CPC .............. *H04N 23/51* (2023.01); *F21S 8/026* (2013.01); *F21V 23/003* (2013.01); *F21V 33/0056* (2013.01); *H04N 7/183* (2013.01); *H04N 23/54* (2023.01); *F21Y 2115/10* (2016.08); *H04L 12/10* (2013.01); *H04W 4/80* (2018.02); *H04W 84/18* (2013.01)

(58) Field of Classification Search
None
See application file for complete search history.

(56) References Cited

U.S. PATENT DOCUMENTS 7,693,679 B1 * 4/2010 Warnke .................. G01J 5/025
236/1 C
9,723,693 B1 * 8/2017 Megginson .......... G06V 40/103
(Continued)

FOREIGN PATENT DOCUMENTS

JP 2010123534 6/2010
JP 2017078606 4/2017
(Continued)

OTHER PUBLICATIONS

International Search Report and Written Opinion, PCT/US2021/018232, mailed on Jun. 10, 2021.
(Continued)

*Primary Examiner* — Irfan Habib
(74) *Attorney, Agent, or Firm* — Greenberg Traurig

(57) ABSTRACT

Imaging apparatuses and enclosures configured for deployment in connection with ceilings and downlight cavities are disclosed. Certain exemplary aspects relate to imaging apparatuses for monitoring, recording or imaging a space such as a room having overhead lighting provided via ceiling structures that may include enclosures and/or downlight fixtures within ceiling cavities, and various imaging apparatuses herein may include an infrared or thermal camera, for example, for imaging within such spaces.

20 Claims, 14 Drawing Sheets

Related U.S. Application Data continuation of application No. 16/796,862, filed on Feb. 20, 2020, now Pat. No. 11,172,102.

(51) Int. Cl.
| | |
|---|---|
| *F21V 23/00* | (2015.01) |
| *F21V 33/00* | (2006.01) |
| *H04N 7/18* | (2006.01) |
| *H04N 23/54* | (2023.01) |
| *F21Y 115/10* | (2016.01) |
| *H04L 12/10* | (2006.01) |
| *H04W 4/80* | (2018.01) |
| *H04W 84/18* | (2009.01) |

(56) References Cited

U.S. PATENT DOCUMENTS

| | | | |
|---|---|---|---|
| 9,924,078 B2 | 3/2018 | Wieser | |
| 10,371,329 B2* | 8/2019 | Coakley | F21V 17/105 |
| 10,582,095 B2* | 3/2020 | Steffanson | H04N 7/181 |
| 10,823,349 B2* | 11/2020 | Coakley | F21V 17/105 |
| 11,172,102 B2 | 11/2021 | Dintner et al. | |
| 11,761,597 B1* | 9/2023 | Zheng | F21S 8/026 |
| | | | 362/235 |
| 11,831,966 B2 | 11/2023 | Dintner et al. | |
| 12,117,141 B1* | 10/2024 | Zheng | F21S 8/026 |
| 2006/0250788 A1* | 11/2006 | Hodge | F21S 8/02 |
| | | | 362/147 |
| 2009/0059603 A1* | 3/2009 | Recker | H05B 47/19 |
| | | | 362/362 |
| 2009/0295923 A1* | 12/2009 | Moore | G08B 13/19695 |
| | | | 348/E5.022 |
| 2010/0148672 A1 | 6/2010 | Hopper | |
| 2010/0270470 A1 | 10/2010 | Sasaki et al. | |
| 2011/0134239 A1* | 6/2011 | Vadai | F21V 29/74 |
| | | | 313/46 |
| 2012/0220307 A1* | 8/2012 | Wohlert | H04W 4/16 |
| | | | 455/456.1 |
| 2012/0281083 A1 | 11/2012 | Chivers et al. | |
| 2012/0293652 A1* | 11/2012 | Farmer | F21V 19/04 |
| | | | 315/50 |
| 2013/0169814 A1* | 7/2013 | Liu | H04N 7/183 |
| | | | 348/151 |
| 2014/0168425 A1 | 6/2014 | Swenson | |
| 2014/0240493 A1* | 8/2014 | Bang | H04N 7/188 |
| | | | 348/143 |
| 2015/0029320 A1 | 1/2015 | Wieser | |
| 2015/0077567 A1* | 3/2015 | Scalisi | H04N 23/50 |
| | | | 348/152 |
| 2015/0377711 A1* | 12/2015 | Steffanson | G01J 5/0831 |
| | | | 250/349 |
| 2016/0100086 A1* | 4/2016 | Chien | H04N 7/183 |
| | | | 348/143 |
| 2016/0128167 A1* | 5/2016 | Sun | H05B 47/1985 |
| | | | 315/297 |
| 2016/0134826 A1 | 5/2016 | Scalisi | |
| 2016/0261824 A1* | 9/2016 | Scalisi | F21V 33/0056 |
| 2016/0350921 A1* | 12/2016 | Bataller | G06T 7/75 |
| 2017/0223807 A1* | 8/2017 | Recker | H05B 47/115 |
| 2018/0035084 A1* | 2/2018 | Swiss | G08B 13/19632 |
| 2018/0091569 A1* | 3/2018 | Roth | H04N 21/43615 |
| 2018/0091775 A1 | 3/2018 | Jung et al. | |
| 2018/0109703 A1 | 4/2018 | Steffanson et al. | |
| 2018/0165930 A1* | 6/2018 | Hertzman | H04N 23/51 |
| 2018/0316894 A1* | 11/2018 | Cai | H04N 23/23 |
| 2019/0098725 A1* | 3/2019 | Sadwick | H05B 45/20 |
| 2019/0224350 A1 | 7/2019 | Marry et al. | |
| 2020/0045796 A1 | 2/2020 | Deixler et al. | |
| 2021/0006750 A1* | 1/2021 | Scalisi | G06F 3/167 |
| 2021/0266428 A1 | 8/2021 | Dintner et al. | |
| 2022/0053109 A1 | 2/2022 | Dintner et al. | |

FOREIGN PATENT DOCUMENTS

| | | |
|---|---|---|
| JP | 2017091619 | 5/2017 |
| KR | 20190074730 | 6/2019 |

OTHER PUBLICATIONS

Matsumoto, Hiroya, "A Task Offloading Method Considering Mobility and Turning Behavior in Mobile-Edge Computing Architectures." IEICE Technical Report, The Institute of Electronics, Information and Communication Engineers, Mar. 8, 2019.

Extended European Search Report, EP21757042.3, mailed on Feb. 5, 2024.

* cited by examiner

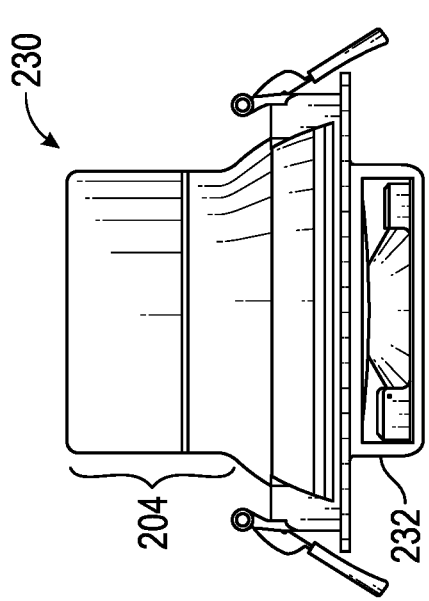
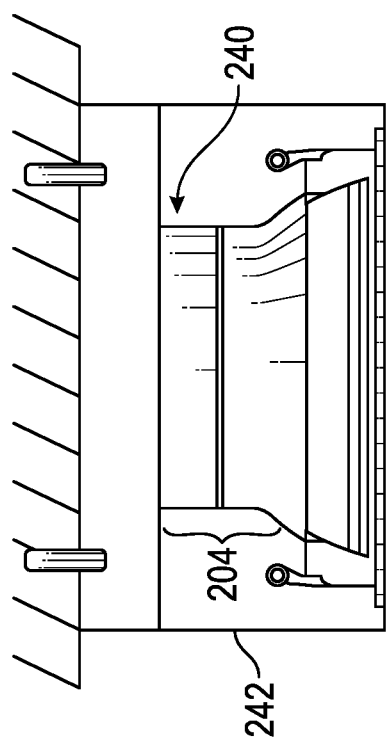
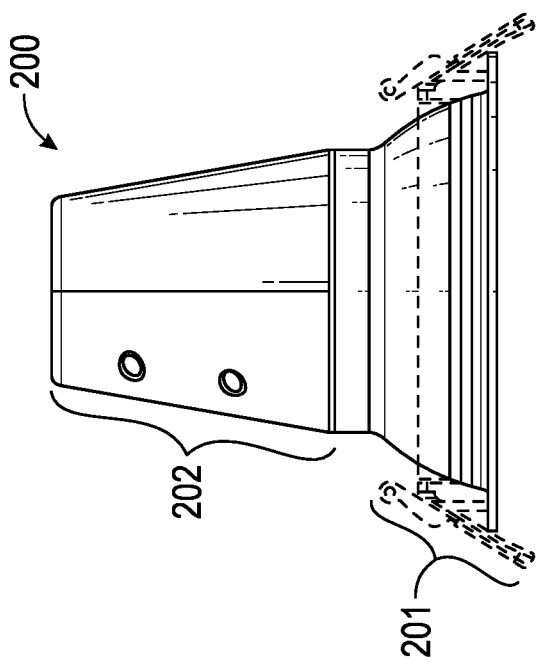
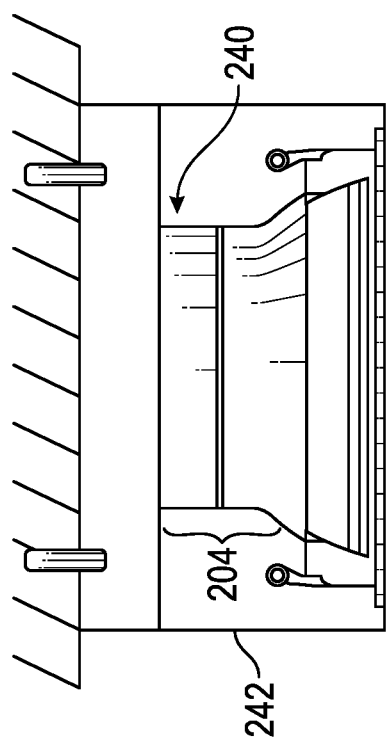

IMAGING APPARATUSES AND ENCLOSURES CONFIGURED FOR DEPLOYMENT IN CONNECTION WITH CEILINGS AND DOWNLIGHT CAVITIES

RELATED APPLICATIONS

The present application is a continuation application of U.S. patent application Ser. No. 17/515,136 filed Oct. 29, 2021, which is a continuation application of U.S. patent application Ser. No. 16/796,862 filed Feb. 20, 2020 and issued as U.S. Pat. No. 11,172,102 on Nov. 9, 2021, the entire disclosures of which applications are hereby incorporated herein by reference.

TECHNICAL FIELD

At least some embodiments disclosed herein relate, in general, to imaging apparatuses for monitoring, recording or imaging a space such as a room having overhead lighting provided via ceiling structures including enclosures and/or downlight fixtures within ceiling cavities, to improve security, safety, energy usage, and to detect human occupancy and/or their activities, and more specifically, to systems and apparatuses for deploying an infrared or thermal camera, e.g., for imaging, within such structures.

BACKGROUND

A common method for monitoring a room for activity and/or regions of interest is to mount, within the room, an imaging apparatus capable of detecting the events or regions. The imaging apparatus may include a camera, a structured light source or similar apparatus, or some combinations of such devices. Further, the imaging apparatus may be mounted in a position and orientation that allows it to detect events in a desired region of interest and/or to maximize room coverage.

A variety of methods, assemblies and apparatuses exist for the positioning and installation of an imaging apparatus within a room. One method is simply to hang an imaging apparatus, such as an IR camera, from the ceiling of a room to capture a relevant region within the room. Such straightforward deployment has the disadvantage that the existence of such an apparatus is almost always visible, especially when people are quite aware of where to look for a camera (e.g., a common place for installing an imaging device being at upper corners of a room). As such, in some scenarios, offenders may figure out ways to circumvent the field of view of the surveillance camera while attempting wrongdoing within a monitored room, given that the camera is easily seen. Moreover, in some other scenarios where the surveillance is performed for the well-being of the people in the room (e.g., senior housing facilities, hospitals, etc.), a visible camera may impact the psychological sensitivities of the people being monitored, which may generate unwanted side effects such as causing people to be less active or social even they are in an activity room.

Further, in many existing implementations, a set-up process is generally required to ensure that there is minimal obscuring or occlusion within the view of the imaging apparatus, i.e., within the field-of-view of the region to be monitored. Absent such set-up and calibration, imaging systems are unlikely to achieve monitoring and/or surveillance in a satisfactory and effective manner when the monitored subject matter consistently fails to appear in the captured images. Additionally, even when such installation and set-up is thoroughly vetted, layouts in a monitored area (e.g., a room) may change due to various reasons and needs. For example, large furniture or other tall items may be moved to different locations in the room, a table or bed may be moved to a different location, and so on. As a result, a field of view that was previously vetted and relatively clear may become obstructed, such that the imaging apparatus typically needs to be re-configured or re-installed to adjust for such changes in a room or region of interest.

BRIEF DESCRIPTION OF THE DRAWINGS

The embodiments are illustrated by way of example and not limitation in the figures of the accompanying drawings in which like references indicate similar elements.

FIG. 2A illustrates a side view of an example imaging assembly having a conical or frusto-conical upper portion, according to one or more embodiments herein.

FIG. 2B illustrates a side view of an example imaging assembly having a cylindrical upper portion, according to one or more embodiments herein.

FIG. 2C illustrates a side view of an example imaging assembly having a cylindrical upper portion and a protrusion for an angularly aimed imaging device, according to one or more embodiments herein.

FIG. 2D illustrates a side view of an example imaging assembly having a cylindrical upper portion and contained within a ceiling mount housing, according to one or more embodiments herein.

DETAILED DESCRIPTION

Figure 1A:
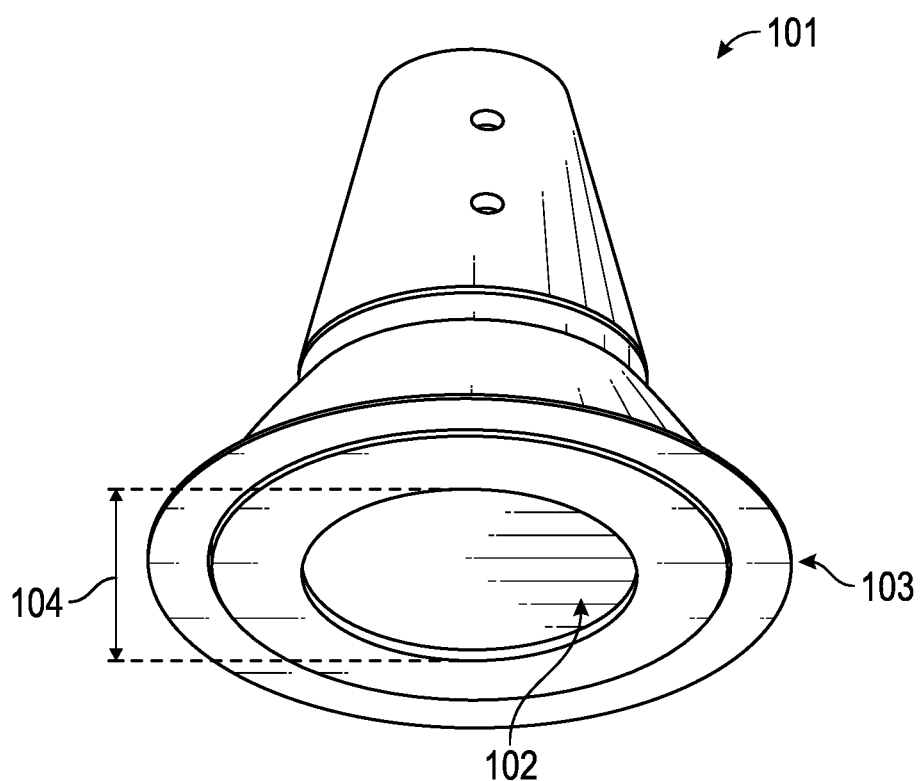
FIG. 1A illustrates a perspective view of an example imaging assembly adapted for installation in a downlight, according to one or more embodiments herein.

The following description and drawings are illustrative and are not to be construed as limiting. Numerous specific details are described to provide a thorough understanding. However, in certain instances, well known or conventional details are not described in order to avoid obscuring the description. References to one or an embodiment in the present disclosure are not necessarily references to the same embodiment; and, such references mean at least one.

The following generally describes imaging assemblies, apparatuses, systems and methods that improve upon the current state of the art, particularly with respect to infrared (such as thermal) imaging or sensing systems that provide monitoring, surveillance and alarm capabilities. As used herein, such infrared imaging may occur over the range of infrared radiation, namely wavelength of about 700 nanometers to about 1 millimeter, while thermal imaging refers to wavelengths ranging from about 9000 nanometers to about 14000 nanometers. Assemblies, apparatuses, systems and methods described herein may leverage existing downlight designs in conjunction with various IR/thermal imaging features and functionality to provide a less visually-intrusive or psychologically-intrusive monitoring, surveillance, and/or alarm systems, to more effectively assay activity and regions of interest. In some embodiments of the present imaging assemblies, for example, the imaging elements are able to monitor activity of interest from directly above a room to reduce occlusion generated when, for example, a person walks or falls behind a table or bed.

Further, the present imaging assemblies may include features related to their deployment in a downlight that facilitate hiding the imaging apparatus from public view. In some embodiments, for example, the imaging device, itself, may be hidden from view by use of a lens (e.g., infrared lens) and/or materials including a layer such as an opaque, IR-transmissive layer (e.g., a film, a solid plate, etc.) over a first region (i.e., aperture), a portion of a surface (e.g., the base), or the entire surface of the imaging assembly. In such embodiments, it is not possible for people beneath the imaging assembly to obtain information regarding the existence or internal construction of the imaging assembly by means of the naked eye. As such, the present innovations provide an improved way to monitor/surveil an area without concern that individuals within the area will be aware of, or circumvent, the imaging apparatus. Further, since individuals being monitored are unaware of the imaging assembly, the psychologically effects that a camera may have on those being monitored are eliminated, which can enable capture of true (versus altered) behavior, and avoid capturing wholly different responses, such as the absence of individuals who avoid an area known to be under surveillance. Moreover, the disclosed technology involves straightforward installation, use and maintenance. In some cases, for example, embodiments here may simply be threaded into a standard downlight receptacle and wirelessly connected to an associated monitoring system to be fully operational.

Furthermore, mounting and set-up of existing imaging hardware is typically difficult to accomplish, often requiring a person with technical skills and tools to properly install and configure an imaging apparatus within a room. In general, a person with knowledge of several technical skills and aspects of video surveillance may be required to achieve the mounting position and orientation necessary to cover a region of interest. For example, an installer may require a specialized monitoring device to display the image recorded by the imaging apparatus such that the installer adjusts the orientation of the imaging device, based on the display on the specialized monitoring device, to achieve proper alignment.

In the present disclosure, the imaging apparatus is configured to be housed within an enclosure that has mounting surfaces adapted to simplify the installation of the imaging apparatus while properly aligning the imaging apparatus with the field of view to be monitored. For example, the imaging assembly may be installed vertically onto the ceiling of a room, either towards the center of the room to achieve a top-down view of an area of interest or towards a corner or near-corner location on the ceiling to achieve a side view of an area of interest, or even vertically onto the walls of a room.

With regard to privacy considerations, implementations herein may monitor a room using an infrared/thermal camera, such as a low-resolution infrared/thermal camera, which avoids identification of activity of any specific individual due to the lack of recorded and/or imaged detail beyond cognition of an infrared/thermal signature. A low-resolution infrared/thermal camera or infrared/thermal sensor can detect humans by their elevated body temperature but lacks any further imaging detail needed to make determination(s) regarding an identity or other sensitive details regarding a subject individual.

Further, according to embodiments of the present disclosure, such low-resolution infrared/thermal imaging apparatus may be hidden behind a visually opaque, but infrared/thermal radiation transparent material, which provides yet another technical solution to avoid detection or concern by individuals to be monitored, especially with regard to subjects being monitored only for detection and not identification.

In other embodiments, technical solutions of the disclosed technology avoid drawbacks associated with installation of an imaging apparatus that requires separate installation of cables for the power supply and/or data transmission of recorded footage. Embodiments here, for example, may utilize the AC voltage provided by the light socket to power the image apparatus and associated electronics. Further, many wireless imaging apparatuses typically have a very limited operational time due to the relatively large data volumes to be wirelessly transmitted from visual monitoring with a low, standard or high definition camera. Monitoring devices that use video cameras, for example, typically require a resolution of above 320×240 pixels for good recognition of the monitored area and typically run at more than 1 frame per second. Certain embodiments herein overcome such bandwidth restrictions and drawbacks via use of specific infrared/thermal imaging apparatuses that do not require high resolution associated with identifying such things as a specific individual captured within a detected image.

Turning to the drawings, the disclosed technology provides technical solutions that, inter alia, simplify installation and alignment via an enclosure of the imaging apparatus and hide the imaging apparatus within the enclosure.

FIG. 1A illustrates a perspective view of an example imaging assembly in the shape of a downlight adapted for installation in a ceiling above a room, hallway or other area to be monitored, according to one or more embodiments herein. Referring to FIG. 1A, an imaging assembly 101 may be constructed as an enclosure that is shaped and adapted in the form of a downlight lighting assembly, and designed to carry an imaging apparatus (not shown in FIG. 1; see element 106 of FIG. 1B, and element 175 of FIG. 5). In some embodiments, the imaging apparatus may be oriented to capture images through a first region or aperture 104 (hereinafter "aperture 104") of a base portion 103 covered by a layer 102. This first region is referred to as an aperture since it is transmissive to infrared radiation, while it may be opaque or otherwise not perceived as an aperture in the spectrum of visible light, i.e., to the naked eye. The imaging apparatus may be fixed within the enclosure and specifically aligned with respect to the enclosure and aperture such that when the assembly is inserted into an existing downlight receptacle of a room (e.g., in a ceiling, wall, etc.), the imaging apparatus is in a known and desirable orientation with respect to the room to be monitored. In some embodiments, the aperture 104 can extend throughout the base portion 103, or any portion of the base portion 103.

In some embodiments, the aperture 104 through which the imaging apparatus is configured to detect and/or receive sensory/imaging information (infrared radiation, and/or thermal radiation) may be covered with an IR-transmissive, yet optically opaque, layer 102 (e.g., a film, a solid plate, an infrared lens, or any other optical element). In addition to the layer 102, the enclosure may be manufactured of optically opaque materials. Such materials be made out of polymer material, such as polyethylene (PE) or polypropylene (PP). The polymer materials from which the layer and/or enclosure are made may appear white and non-transparent in the visual band for the human eye, but can be transparent in the infrared band. These materials may comprise other visually non-transparent, but infrared transparent materials, such as Germanium (Ge) or Silicon (Si). These materials appear, to the human eye, opaque or otherwise non-transparent, and visible light cannot pass through such materials due to the non-transmission of frequencies of the visual band through such materials.

In one embodiment, the assembly 101 may be dimensioned to fit by threaded engagement within a commercially available downlight, wherein the aperture 104 (which, to an observer, appears like the bottom surface of a light fixture) can be fitted with an IR transmissive yet optically opaque layer 102, or an element adapted with an IR transmissive yet optically opaque layer 102. This way, the imaging apparatus enclosed within the assembly 101 is not visible to a person positioned below or within the field-of-view of the imaging apparatus, e.g., by virtue of the layer being opaque to visible light. Because the layer 102 is IR transmissive, however, the imaging apparatus enclosed within the assembly 101 can receive and detect infrared and thermal sensory data.

In some embodiments, imaging devices such as those disclosed in U.S. patent application Ser. No. 14/750,403, filed Jun. 25, 2015, published as U.S. Pat. App. Pub. No. 2015/0377711, and entitled "Apparatus and Method for Electromagnetic Radiation Sensing", U.S. patent application Ser. No. 14/788,286, filed Jun. 30, 2015, and entitled "Micromechanical Device for Electromagnetic Radiation Sensing", U.S. patent application Ser. No. 14/810,363, filed Jul. 27, 2015, and entitled "Micromechanical Device for Electromagnetic Radiation Sensing", and/or U.S. patent application Ser. No. 15/188,116, filed Jun. 21, 2016, and entitled "Fabrication Method for Micromechanical Sensors" may be utilized as the imaging apparatus mounted inside the assembly 101. However, other imaging devices may also be used.

In some embodiments, the imaging apparatus disposed within the assembly may be, for example, a low-resolution thermal imaging apparatus having, e.g., 30×20 thermal infrared pixels to capture the scenery with a low frame rate (e.g., 1 frame per second, or no more than 9 frames per second, etc.). Further, the imaging apparatus may transmit such imagery wirelessly to a remote receiving unit. Here, for example, the imaging assembly 101 may be mounted in a room and may be connected to a server and/or even a mobile device 117, to yield a thermal imaging system with control functionality, as set forth in more detail in connection with FIG. 12, below.

In some embodiments, the imaging assembly 101 may be positioned such that the imaging apparatus is configured to have a top-down view. For instances, the imaging assembly 101 may be installed at a ceiling of the room. In these embodiments, with the imaging apparatus observing the room from above instead of from a corner of the room, occurrence of occlusions may be reduced, e.g., when a person walks behind a larger piece of furniture, or when a patient falls down behind a table or bed outside the viewing range on traditional camera locations.

Figure 3A:
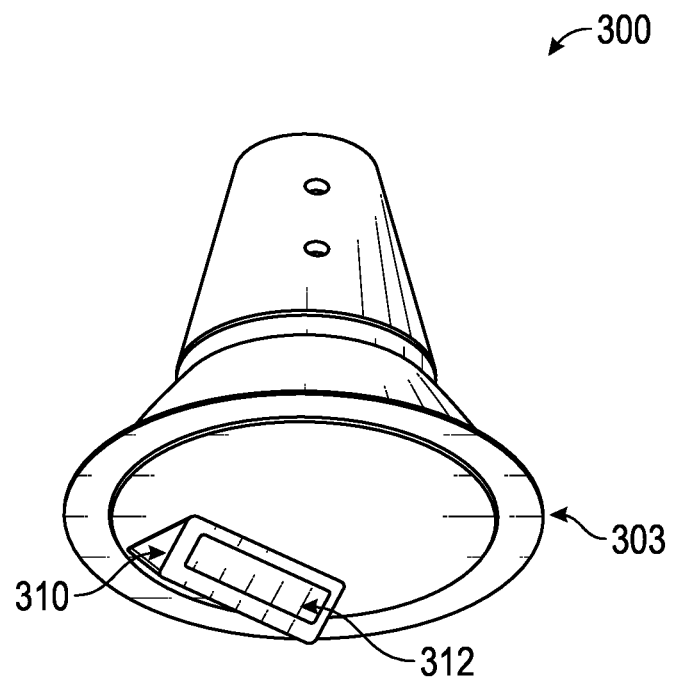
FIG. 3A shows a perspective view of another example imaging assembly adapted for installation in a downlight and having a protrusion for angled imaging, according to one or more embodiments herein.

As set forth further in connection with FIG. 3A, below, the imaging apparatus of some embodiments may be angled or positioned within the assembly 101 such that the imaging apparatus is directed at a sideways angle and configured to capture a side view of certain areas of a room, even though imaging assembly 101 is positioned inside a ceiling light fixture of the room. For instances, the imaging assembly 101 may be installed in a downlight, while the imaging apparatus may be angled and adapted the enclosure to achieve a viewing angel that captures a region of a room on a side of, rather than directly beneath, the assembly 101. For other instances, an imaging assembly 300 as illustrated in FIG. 3A may be installed at a ceiling of a corner or near corner of the room, or at any location of the ceiling of the room, while being angled and configured to capture images from a region other than directly beneath the downlight fixture.

In some embodiments, the imaging assembly 101 may further include a lighting source such as a LED light disposed inside the enclosure. For example, the LEDs can be configured to provide a cone-shaped beam directly underneath the assembly, having a radius of a traditional downlight.

Here, not only does such imaging look like a downlight, but it also functions to provide light in the same way. As a result, to a person below, the imaging assembly 101 is observed and identified as a light, being impossible to distinguish from a regular downlight that does not have an infrared/thermal imaging apparatus enclosed within. In some embodiments, the imaging assembly 101 can further include elements such as color LEDs, controllable color LEDs, dimmable LEDs, and even speakers, to allow users such as room occupants to manipulate the ambience by controlling the LEDs, the color of light, and/or audio provider through a speaker by means of a controller. For instances, such controllable colorable LEDs can be disposed inside the imaging assembly 101 as "mood-lights." The audio elements such as speakers and the controller may also be disposed within the assembly.

Figure 1B:
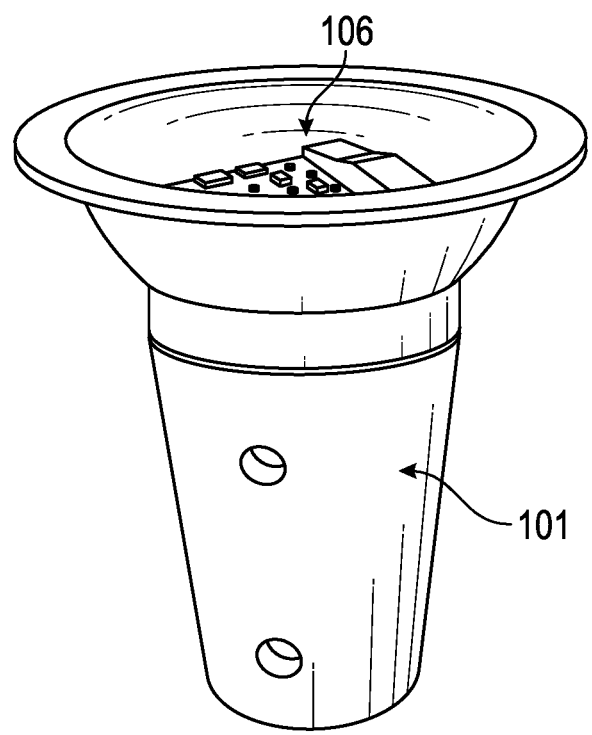
FIG. 1B illustrates a perspective view of imaging assembly without a cover or layer and showing internal components thereof, according to one or more embodiments herein.

FIG. 1B illustrates a perspective view of imaging assembly 101 without a cover or layer and showing internal components thereof, according to one or more embodiments herein. Referring to FIG. 1B, the imaging assembly 101 shows an imaging apparatus 106, such as a thermal or infrared imaging apparatus or element disposed therein.

Figure 1C:
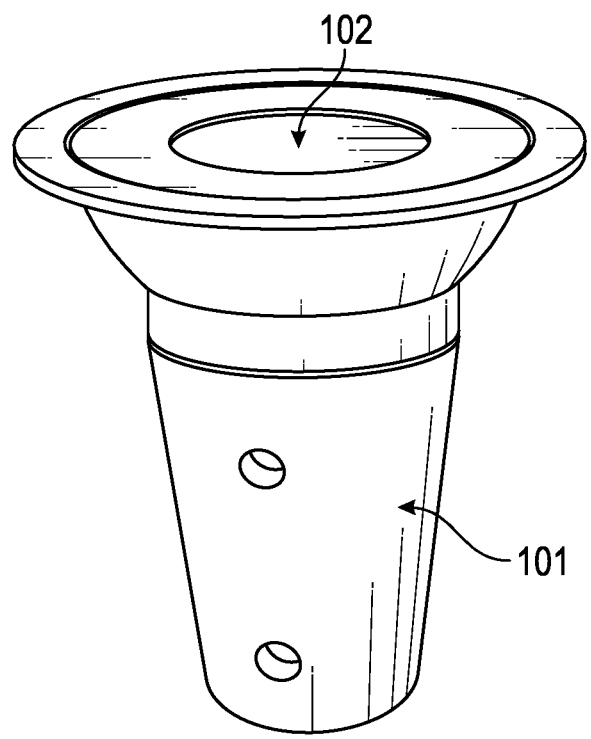
FIG. 1C shows a perspective view of the imaging assembly illustrated in FIG. 2A, with a cover or layer, according to one or more embodiments herein.

FIG. 1C illustrates a perspective view of the imaging assembly illustrated in FIG. 1B, showing the assembly 101 having a cover or layer 102, according to one or more embodiments herein. Referring to FIG. 1C, the imaging assembly 101 is shown with its base portion 103 having a layer 102 that is IR transmissive yet optically opaque, and through which the imaging apparatus 106 (shown in FIG. 1B) is configured to receive and/or detect sensory data, such as infrared/thermal signatures.

Figure 1D:
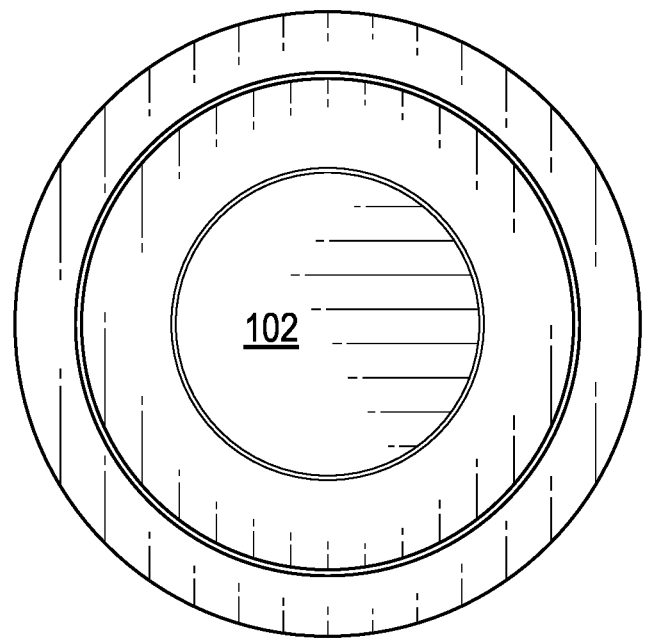
FIG. 1D shows a bottom view of the imaging assembly illustrated in FIG. 2B, according to one or more embodiments herein.

FIG. 1D illustrates a bottom view of the imaging assembly illustrated in FIG. 1C, according to one or more embodiments herein. Referring to FIG. 1D, the imaging assembly 101 is shown with the layer 102 that may be IR transmissive while being optically opaque.

FIG. 2A illustrates a side view of an example imaging assembly having a conical or frusto-conical upper portion, according to one or more embodiments herein. Referring to FIG. 2A, an imaging assembly 200 shows a conical or frusto-conical upper portion 202 above a base portion 201 of the imaging assembly.

FIG. 2B illustrates a side view of an example imaging assembly having a cylindrical upper portion, according to one or more embodiments herein. Referring to FIG. 2B, an imaging assembly 220 shows cylindrical upper portion 204 above a base portion 201 of the imaging assembly.

FIG. 2C illustrates a side view of an example imaging assembly having a cylindrical upper portion 202 and a protrusion 232 for an angularly aimed imaging device, according to one or more embodiments herein. Referring to FIG. 2C, an imaging assembly 230 shows cylindrical upper portion 202 and a protrusion 232. The protrusion 232 extends downward away from the cylindrical upper portion at the bottom surface of a base portion of the imaging assembly 230. According to embodiments herein, the protrusion 232 may house an angularly aimed imaging device therein.

FIG. 2D illustrates a side view of an example imaging assembly having a cylindrical upper portion 204 and contained within a ceiling mount housing, according to one or more embodiments herein. Referring to FIG. 2D, an imaging assembly 240 shows a cylindrical upper portion and being contained within a ceiling mount housing 242. In this example, the ceiling mounting housing 242 is affixed to a ceiling via a mounting plate. In various embodiments, a cylindrically structured upper portion allows for space usage optimization when the imaging assembly 240 is coupled with a cylindrical mount housing. As shown herein, such ceiling mount housing 242 allows the imaging assembly 240 to be affixed or mounted to the ceiling. In some scenarios, such direct ceiling mounting is employed when a lower hanging second ceiling is not available for the imaging assembly 240 be installed in an embedded manner, such as within a downlight.

Figure 2G:
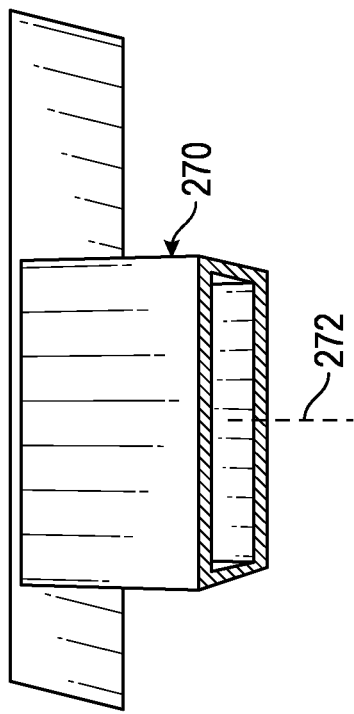
FIG. 2G illustrates a perspective view of an example imaging assembly within a cuboid-shaped housing and having an and an imaging device configured to image a top-down view, according to one or more embodiments herein.
Figure 2H:
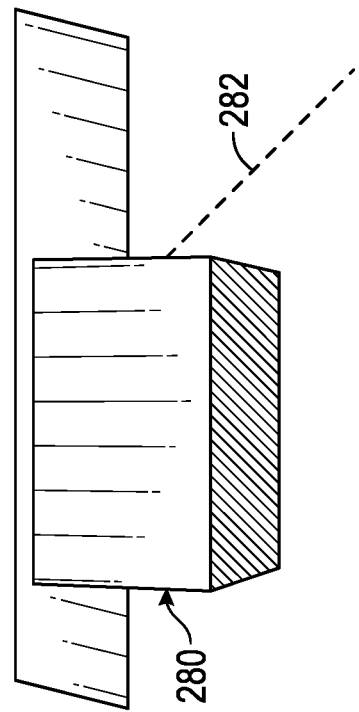
FIG. 2H illustrates a perspective view of an example imaging assembly within a cuboid-shaped housing and having an and an imaging device configured to provide a lateral view of a room (an 'in-room' view), according to one or more embodiments herein.
Figure 2E:
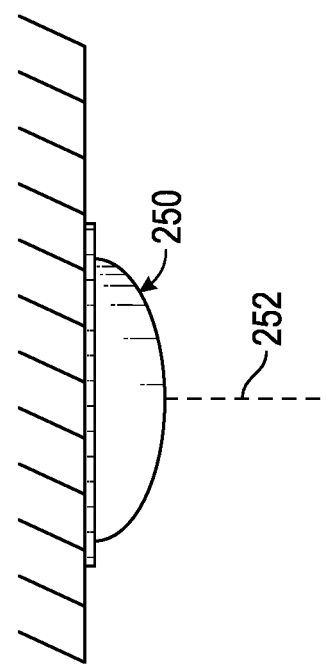
FIG. 2E illustrates a side view of an example imaging assembly having a dome-shaped aperture and an imaging device configured to image a top-down view, according to one or more embodiments herein.

FIG. 2E illustrates a side view of an example imaging assembly having a dome-shaped aperture and an imaging device configured to image a top-down view, according to one or more embodiments herein. Referring to FIG. 2E, an imaging assembly 250 shows dome-shaped housing and an enclosed imaging device (not shown) configured with an optical axis 252 for imaging a top-down view.

Figure 2F:
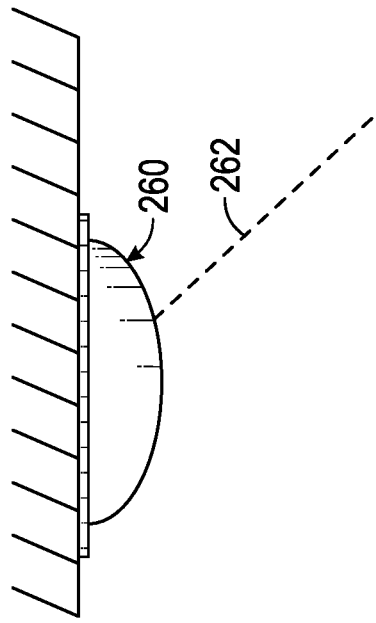
FIG. 2F illustrates a side view of an example imaging assembly having a dome-shaped aperture and an angularly-aimed imaging device configured to provide a lateral view of a room (an 'in-room' view), according to one or more embodiments herein.

FIG. 2F illustrates a side view of an example imaging assembly having a dome-shaped aperture and an angularly-aimed imaging device configured to provide a lateral view of a room (an 'in-room' view), according to one or more embodiments herein. Referring to FIG. 2F, an imaging assembly 260 shows dome-shaped housing and an enclosed, angularly-aimed imaging device (not shown) configured with an optical axis 262 for imaging a lateral view of a room underneath the ceiling (e.g., an "in-room" view).

FIG. 2G illustrates a perspective view of an example imaging assembly within a cuboid-shaped housing and having an imaging device configured to image a top-down view, according to one or more embodiments herein. Referring to FIG. 2G, an imaging assembly 270 shows cuboid-shaped housing and an imaging device (not shown) configured with an optical axis 272 for imaging a top-down view.

FIG. 2H illustrates a perspective view of an example imaging assembly within a cuboid-shaped housing and having an and an imaging device configured to provide a lateral view of a room (an 'in-room' view), according to one or more embodiments herein. Referring to FIG. 2H, an imaging assembly 280 shows a cuboid-shaped housing and an enclosed, angularly-aimed imaging device (not shown) configured with an optical axis 282 for imaging a lateral view of a room underneath the ceiling (e.g., an "in-room" view).

FIG. 3A illustrates a perspective view of another exemplary imaging assembly 300 adapted for installation in a downlight, according to one or more embodiments herein.

Referring to FIG. 3A, the imaging assembly 300 has an enclosure that is also structured in the shape/form factor of a downlight, and designed to carry an imaging apparatus (such as imaging apparatus 106 of FIG. 1B, and/or 175 of FIG. 5), which is fixed to and specifically aligned with respect to the enclosure such that, when the assembly 300 is affixed within a room (e.g., to a ceiling or wall), the imaging apparatus is in a preferred angular orientation with respect to capturing images from a desired area of the room to be monitored. In the embodiment shown, the imaging apparatus may be angled or aimed towards a desired direction (e.g., other than straight down) via a protrusion 310 that is formed or disposed on a surface of the circular base portion 303 to house the imaging apparatus and/or align it to point to a coverage area of interest. One or more imaging apparatuses may be contained within the assembly 300 and configured to detect infrared images (e.g., thermal images) through one or both of a first surface 312 and/or a second surface (not shown). Some aspects and advantages of utilizing an angled imaging apparatus consistent with FIG. 3A are set forth further below in connection with FIG. 10.

Moreover, as with prior embodiments, these surfaces 312 may be covered with a layer that is IR transmissive yet optically opaque. As such, according to embodiments consistent with FIG. 3A, an imaging apparatus may be configured to receive and/or detect sensory data in any direction, based on an appropriate alignment of the imaging apparatus within the assembly and a IP-transmissive surface that is covering the base portion 303 in the desired direction. Further, here, the assembly 300 may include one or more orientation markers, where such orientation markers convey an orientation that the assembly is to be positioned within a downlight fixture so that the assembly, which has a radially-symmetric structure, is aligned in a direction such that the imaging apparatus is pointed towards the region or area where the desired infrared/thermal signatures are to be captured.

Accordingly, in some embodiments, the imaging assembly 300 of FIG. 3A may be positioned such that the imaging apparatus is configured to have a side view of the room, even though imaging assembly 300 is affixed within a downlight in the ceiling of the room. For example, the imaging assembly 300 may be installed in a downlight, while the imaging apparatus is adapted inside the assembly to capture a viewing angel showing the side of the room. Similarly, an imaging assembly 300 may be installed in a downlight near a corner or wall of a room, and the imaging apparatus can be configured in a way that a known obstacle in the room (e.g., pillars, dividing walls, or other structure or furniture) can be avoided by capturing a view from a sideways perspective.

Figure 3B:
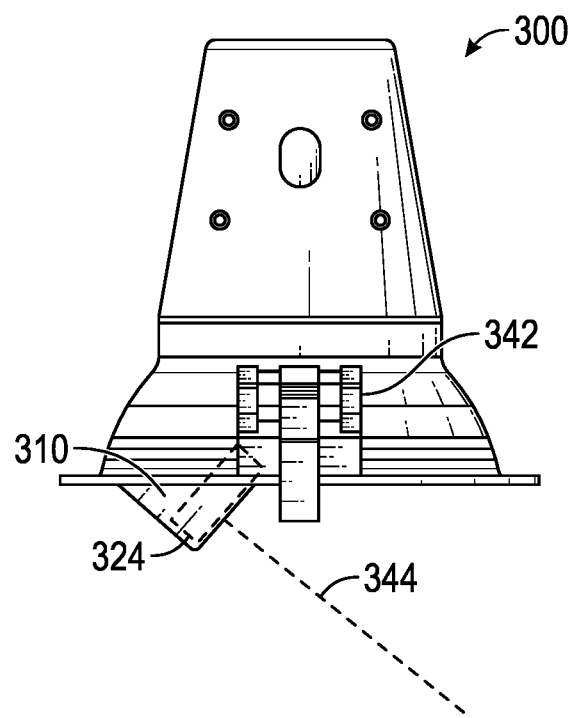
FIG. 3B shows a side view of the example imaging assembly of FIG. 3A with a protrusion containing a thermal sensor 324 in an angular orientation for capturing lateral images therebelow, according to one or more embodiments herein.

FIG. 3B shows a side view of the example imaging assembly of FIG. 3A with a protrusion containing a thermal sensor 324 in an angular orientation for capturing lateral images therebelow, according to one or more embodiments herein. Referring to FIG. 3B, the imaging assembly 300 has the thermal sensor 324 protruding outwards from a base portion of the imaging assembly 300. In this example, the imaging device is configured with an optical axis 344, which is at an angular orientation for capturing lateral images therebelow the imaging assembly 300.

Figure 3C:
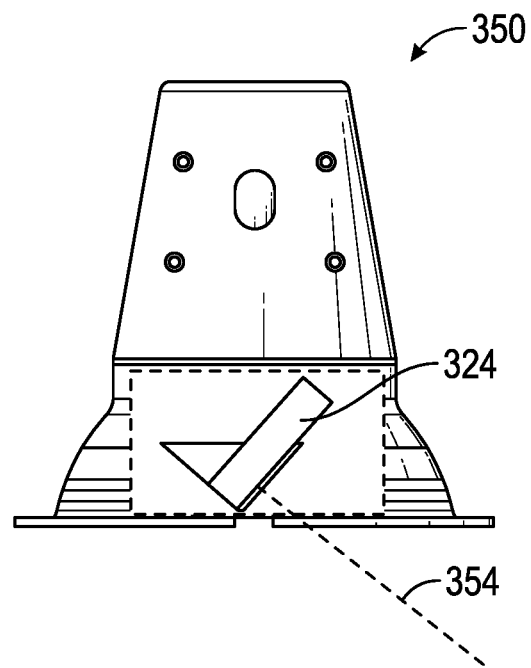
FIG. 3C shows a side view of another example imaging assembly having an internal thermal sensor 324 positioned in an angular orientation for capturing lateral images therebelow, according to one or more embodiments herein.

FIG. 3C shows a side view of another example imaging assembly having an internal thermal sensor 324 positioned in an angular orientation for capturing lateral images therebelow, according to one or more embodiments herein. Referring to FIG. 3C, the imaging assembly 350 has the thermal sensor 324 enclosed entirely within the imaging assembly 350, i.e., with no protrusion 310, though positioned at an angular orientated position relative to the bottom surface of the base portion of the imaging assembly 350. In this example, the imaging device is configured with an optical axis 354 angularly orientated for capturing images in an angular/lateral direction beneath and to a side of imaging assembly 350.

Figure 3D:
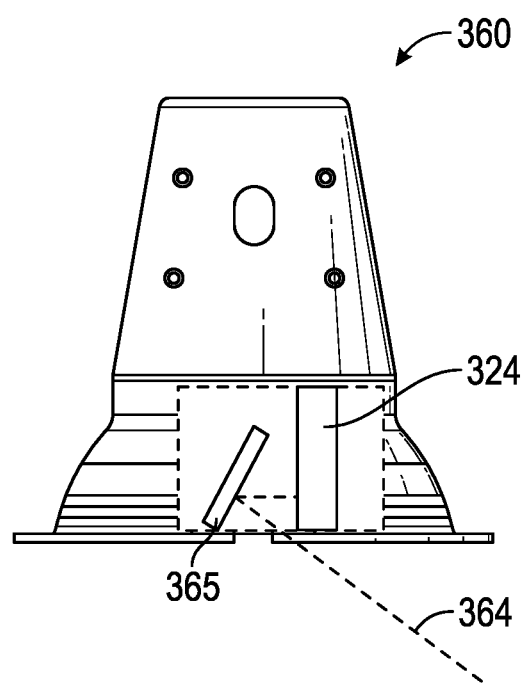
FIG. 3D shows a side view of another example imaging assembly having an internal thermal sensor 324 and a mirror positioned to reflect images received in an angular orientation to the thermal sensor, according to one or more embodiments herein.

FIG. 3D shows a side view of another example imaging assembly having an internal thermal sensor 324 and a mirror positioned to reflect images received in an angular orientation to the thermal sensor, according to one or more embodiments herein. Referring to FIG. 3D, an imaging assembly 360 may comprise a thermal sensor 324 and a mirror 365 enclosed entirely within the imaging assembly 360. In one embodiment, the thermal sensor 324 may be arranged in a substantially vertical position relative to the bottom surface of the base portion of the imaging assembly 360, and the mirror 365 is positioned to reflect images of objects below and to a side of the assembly, received in an angular orientation with respect to the imaging assembly 360. In this example, the imaging device is configured with an optical axis 364, which is at an angular orientation for capturing images below and positioned laterally to the imaging assembly 360.

Figure 4:
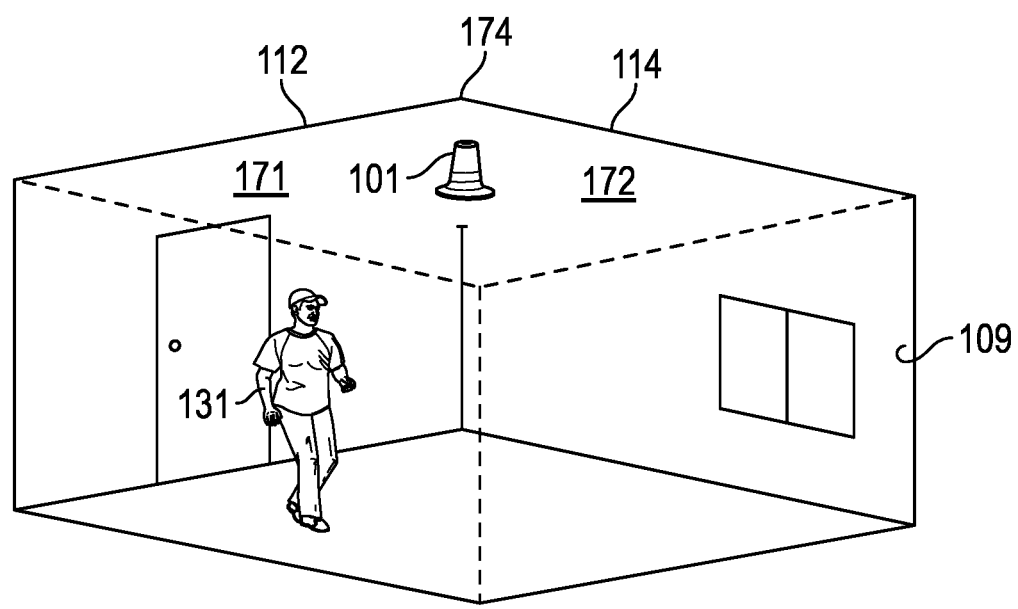
FIG. 4 illustrates an example imaging assembly positioned at a location in a ceiling of a room, according to one or more embodiments herein.

FIG. 4 illustrates an imaging assembly 101 adapted at a central location in a room 109, according to one or more embodiments herein. The imaging assembly 101 shown in FIG. 4 may also be an imaging assembly 300 of FIG. 3. Referring to FIG. 4, the imaging assembly 101 may be located at a central location in the room 109, such as within a downlight fixture that is positioned to provide light evenly throughout the room 109, which provides advantageous orientation and coverage for detecting infrared/thermal images in the room 109, while being indistinguishable from a conventional light and thus unknown to any occupant of the room 109. The illustrative room 109 of FIG. 4 has a vertical edge 119 where two walls 171, 172 meet, and two horizontal edges 112 and 114 where the wall 171 and 172 meets the ceiling of the room. The horizontal edges 112 and 114 and the vertical edge 119 meet each other at a ceiling corner 174 of the room 109. If existing downlight fixtures are positioned near the corner 174 or horizontal edges 102 and 104 of a room, the imaging assembly 300 of FIG. 3 may be utilized to obtain more expansive coverage of such a room, versus simply performing infrared/thermal imaging directly beneath an imaging assembly 101 of FIG. 1.

Figure 5:
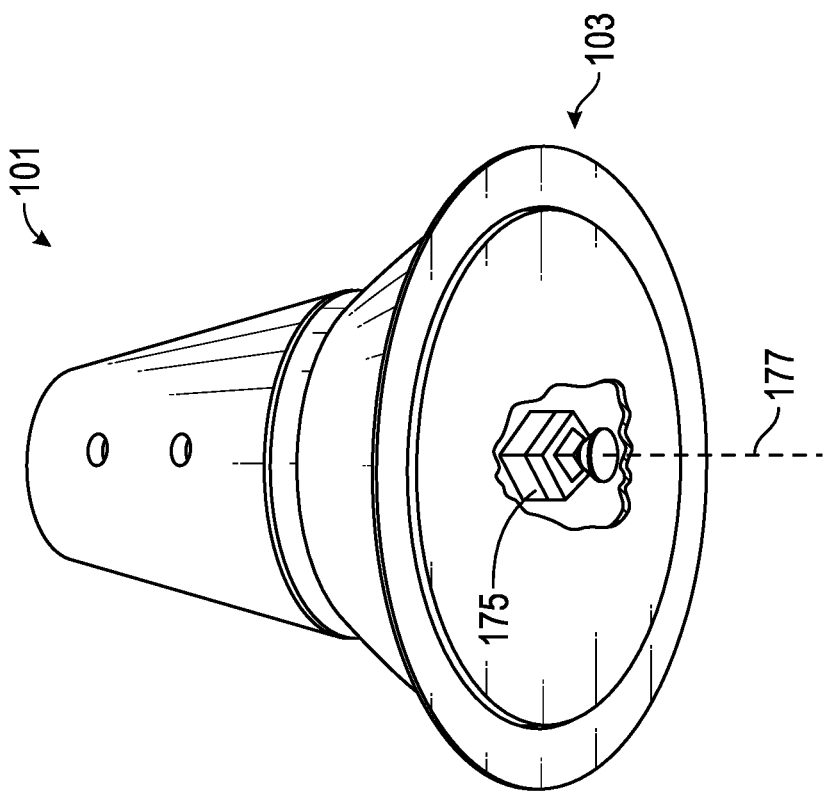
FIG. 5 illustrates an imaging assembly showing internal components including the infrared or thermal imaging apparatus, according to one or more embodiments herein.

FIG. 5 illustrates an imaging assembly 101 showing internal components including the infrared imaging (e.g., thermal imaging) apparatus, according to one or more embodiments herein. Referring to FIG. 5, an imaging assembly 101 is shown with a region of the base portion 103 removed (made transparent) to reveal an exemplary imaging apparatus 175 as well as its optical axis 177.

Figure 6:
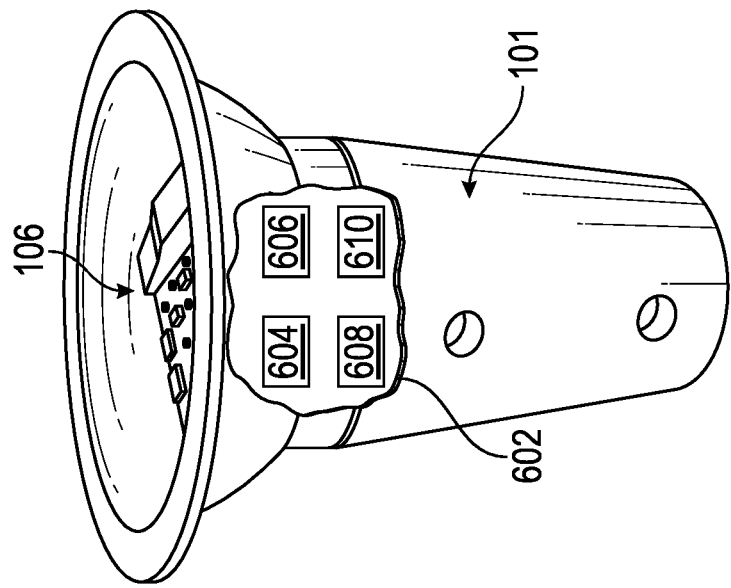
FIG. 6 shows an imaging assembly showing internal components including electronics and processing subcomponents, according to one or more embodiments herein.

FIG. 6 shows an imaging assembly 101 showing internal components including electronics and processing subcomponents, according to one or more embodiments herein. The exemplary imaging assembly of FIG. 6 is shown in a partial cut out view, illustrating imaging apparatus 106 as well as additional internal components 602. In some embodiments, the internal components 602 may comprise a processor 604, one or more data transmission module(s) 606, a power source 608, which may be a power-over-Ethernet (POE) power source, and other electrical subcomponents 610. In various embodiments, these other electrical subcomponents 610 may include components such as one or more of: a microphone, a speaker, a light source (e.g., LEDs, etc.), a motion sensor, e.g., passive infrared (PIR), etc., a relay, one or more input and/or output terminals such as GPIO (general purpose input/output) terminals, a cable, such as a threaded cable for connecting the assembly/detector to a power outlet, and the like.

Figure 7B:
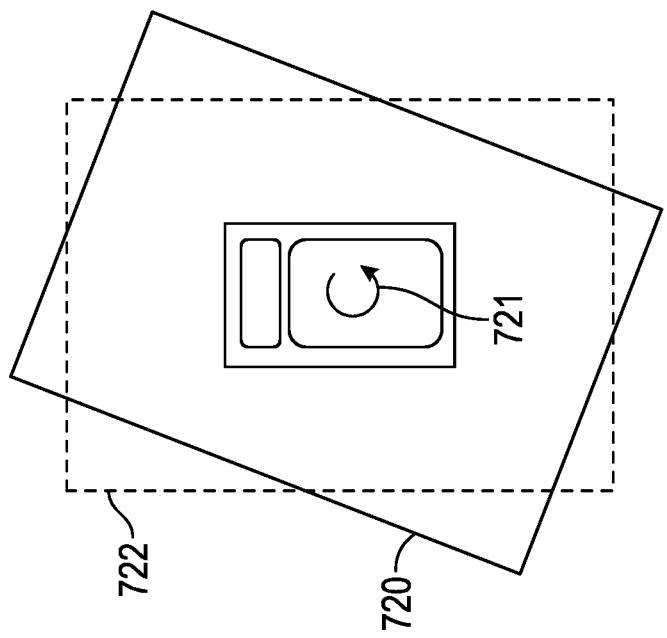
FIGS. 7A-7B illustrate an exemplary imaging assembly, in FIG. 7A, having alignment marks on a bottom surface that enable alignment with a desired field of view and, in FIG. 7B, an example of how an object within such field of view is aligned, according to one or more embodiments herein.
Figure 7A:
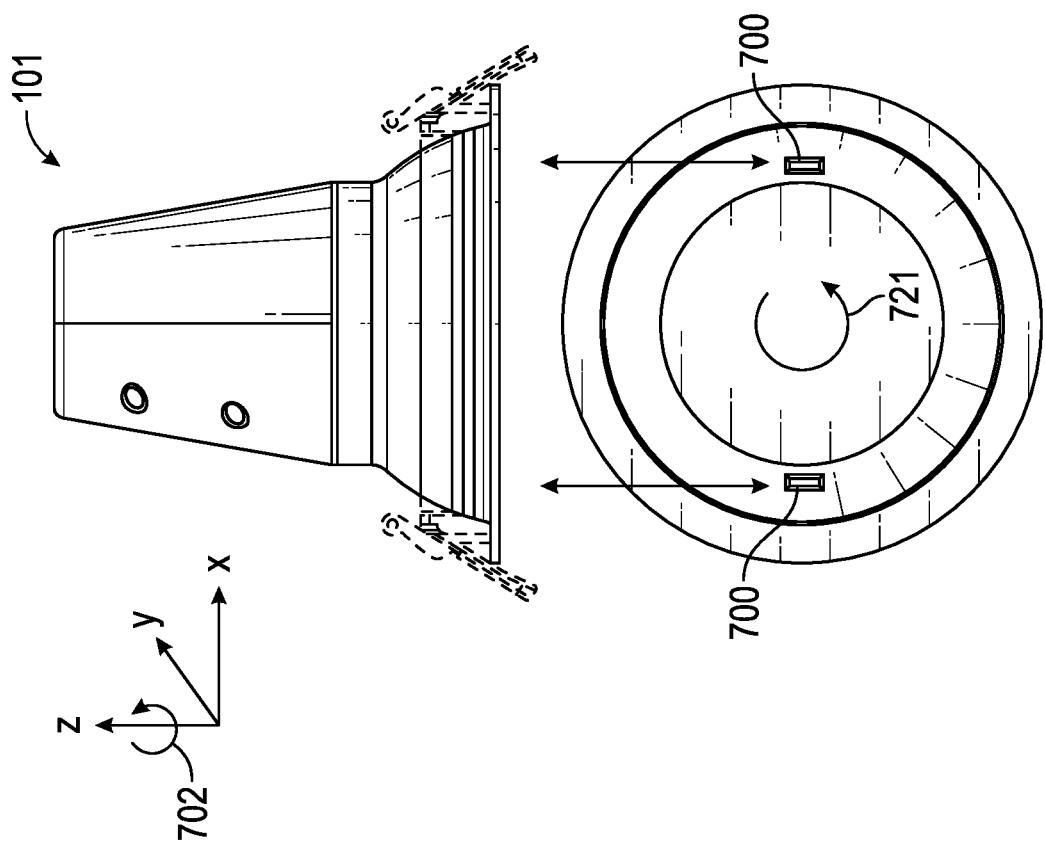

FIGS. 7A-7B illustrate an exemplary imaging assembly, in FIG. 7A, having alignment marks on a bottom surface that enable alignment with a desired field of view and, in FIG. 7B, an example of how an object within such field of view is aligned via such marks, according to one or more embodiments herein. Referring to FIG. 7A, an imaging assembly 101 is configured with alignment marks 700 on the bottom surface. The marks may be placed in various quantity and configured in various positions and/or shapes suitable for aiding the alignment of the imaging device with a desired field of view. As shown in this example, a pair of alignment marks 700 may comprise a pair of rectangular demarcations. As the imaging assembly 101 is affixed to a ceiling vertically, the z axis 702 extends along the dimension that is perpendicular to the ceiling. When a rotatable portion of the imaging assembly 101 is rotated around an axis (here, the z axis), the field of view (FOV) that is captured by the imaging device of the imaging assembly 101 is rotated accordingly. Further, as the alignment marks 700 are visible to an installer of the imaging assembly 101, the installer can use the marks 700 to precisely align the FOV of the imaging device of the imaging assembly 101. Referring to FIG. 7B, a bed is shown in the FOV of the imaging device of the imaging assembly 101. In this example, a first FOV 720 is shown in the solid line, such that the image of the bed is not aligned in the first FOV 720 in the sense that the outer edges of the bed is not aligned in parallel with the side edges of the first FOV 720 being captured prior to adjustment (rotation) of the assembly 101. In comparison, after the adjustment using the marks 700 of FIG. 7A, the second or desired FOV 722 is shown in the dashed line herein. As illustrated, in the desired FOV 722, the outer edges of the bed are aligned to be in parallel with the edges of the second FOV 722 to more effectively capture activity occurring on the bed. In the embodiment shown, here, rotation of the imaging assembly 101 (or subcomponent thereof) in a counterclockwise direction, as shown via arrow 721 of FIG. 7A, effects a rotated of the image being captured in FIG. 7B, also in a counterclockwise direction, from the first FOV 720 to the second FOV 722, as illustrated via arrow 721 of FIG. 7B. In this example, rotation illustrated via arrow 721 correspond to rotation along the z axis 702.

Figure 8A:
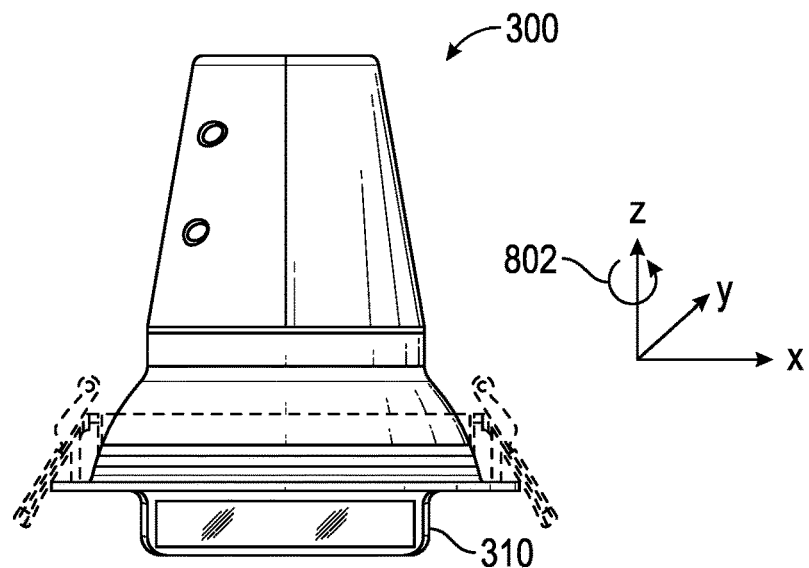
FIGS. 8A-8C illustrate an exemplary imaging assembly with a protrusion for angled imaging, in FIG. 8A, having alignment marks on a bottom surface, in FIG. 8B, and showing how such imaging assembly may be aligned with a field of view and, in FIG. 8C, according to one or more embodiments herein.
Figure 8B:
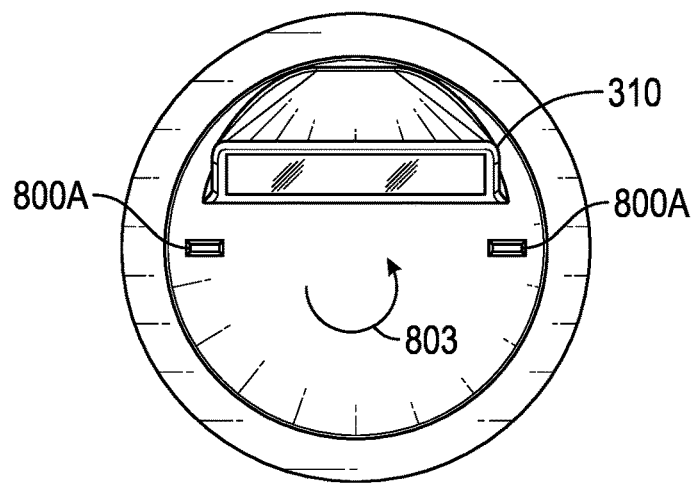
Figure 8C:
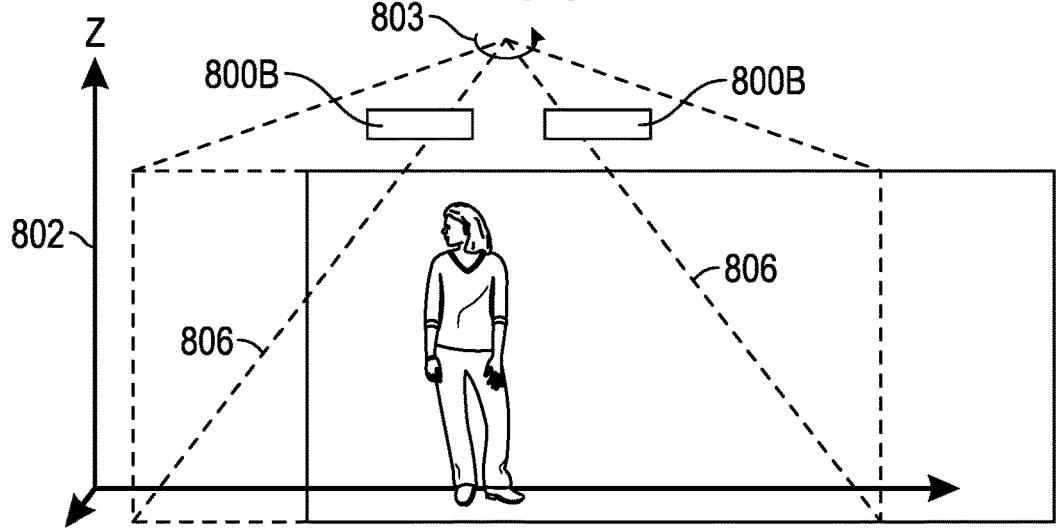

FIGS. 8A-8C illustrate aspects of alignment, including, in FIG. 8A, an exemplary imaging assembly 300 with a protrusion 310 for angled imaging, in FIG. 8B, a bottom view of the imaging assembly 300 having alignment marks 800A on a bottom surface, and, in FIG. 8C, an illustration of how such imaging assembly may be aligned with a field of view of a room, according to one or more embodiments herein. Referring to FIG. 8A, an imaging assembly 300 configured with a protrusion 310 for angled imaging is shown. In embodiments such as those shown, here, the imaging assembly 300 may be affixed to a ceiling vertically, defining a z axis 802 extending in a direction perpendicular to the ceiling. When a rotatable portion of the imaging assembly 300 is rotated around the z axis, the field of view captured by the imaging device of the imaging assembly 300 is accordingly adjusted. In FIG. 8B, a pair of alignment marks 800A are shown on the bottom surface of the imaging assembly 300. As with FIGS. 7A-7B, such alignment marks may be provided in varying quantity and in various positions and shapes suitable for aiding the alignment of the imaging device with a desired field of view. As shown in this example, a pair of alignment marks 800A are provided via a pair of rectangular demarcations. Further, as the alignment marks 800A are visible to an installer of the imaging assembly 300, the installer can use the marks 800A to precisely determine and align the desired field of view to be captured by the imaging device of the imaging assembly 300. In this example, rotation of the assembly 300 around the z-axis via arrow 803 of FIG. 8B correspond to the rotation of the field of view 806 in FIG. 8C around or across hypothetical alignment positions 800B corresponding to the marks 800A of FIG. 8B.

Referring to FIG. 8C, a top-down view is shown in the field of view of the imaging device of the imaging assembly 300. In this example, the field of view is shown in dashed lines 806, with the image of a person standing relatively in the center of the room. Again, the marks 800B are hypothetical marks corresponding to the alignment marks 800A of FIG. 8B, helping illustrate the field of view 806 being captured relative to the positions of the alignment marks 800A on the bottom of the imaging assembly. Rotation about the same z-axis as FIGS. 8A-8B is shown via arrow 803 in FIG. 8C.

Figure 9A:
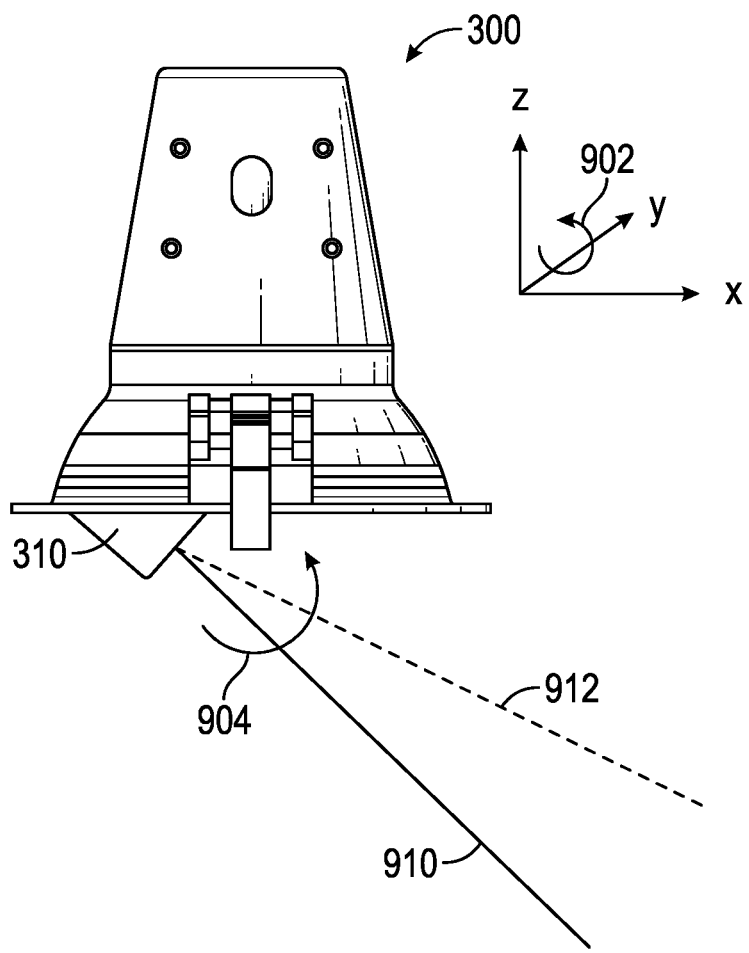
FIGS. 9A-9B illustrate an exemplary imaging assembly having a sensor positionable in an angular orientation, in FIG. 9A, and having an optical axis that may be moved via tilting or rotating the assembly around an axis to adjust a field of view being imaged within a room, as shown in FIG. 9B, according to one or more embodiments herein.
Figure 9B:
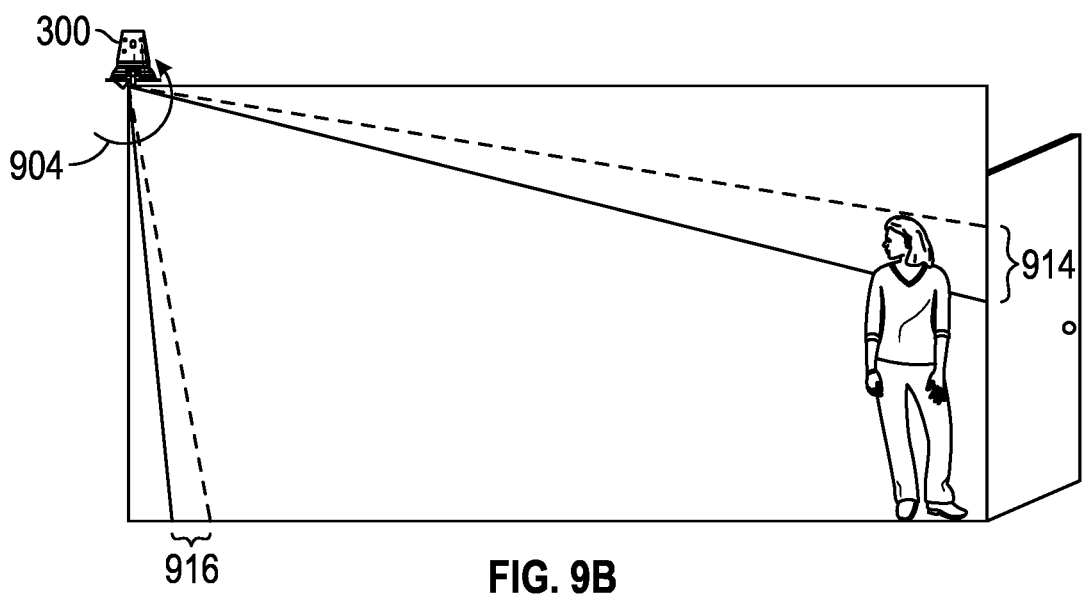

FIGS. 9A-9B illustrate aspects of an exemplary imaging assembly including, in FIG. 9A, a sensor positioned to capture images received at an angular orientation and having an optical axis that may be moved by tilting or rotating the assembly around an axis, according to one or more embodiments herein. FIG. 9B depicts an exemplary room in which such a sensor is positioned, and illustrates how rotation of such assembly may adjust a field of view being imaged within a room, according to one or more embodiments herein. Referring to FIG. 9A, an imaging assembly 300 configured with a protrusion 310 for angled imaging is shown. As the imaging assembly 300 is affixed to a ceiling vertically, the z axis extends along the dimension that is perpendicular to the ceiling, and the y axis 902 extends along a dimension around which the protrusion 310 can be rotated and/or tilted. In such example, when the imaging device (e.g., here, within protrusion 310) is rotated or tilted around the y axis 902, the field of view of the imaging device of the imaging assembly 300 changes accordingly. FIG. 9A illustrates the optical axis as in a field of view 910, 912, which changes in associated with the tilt or rotation position of the protrusion 310. In a first position, this may correspond to a first axis or FOV 914 shown in FIG. 9B. Upon rotation or tilting of the imaging device within the protrusion 310, e.g., represented via arrow 904 in FIGS. 9A and/or 9B, the imaging device may be adjusted to capture a second axis or FOV 916 associated with a second rotated and/or tilted position of the protrusion 310. According to some implementations herein, movements along the arrow 904 may correspond, for example, to movement of the field of view with respect to the y axis 902.

Figure 10:
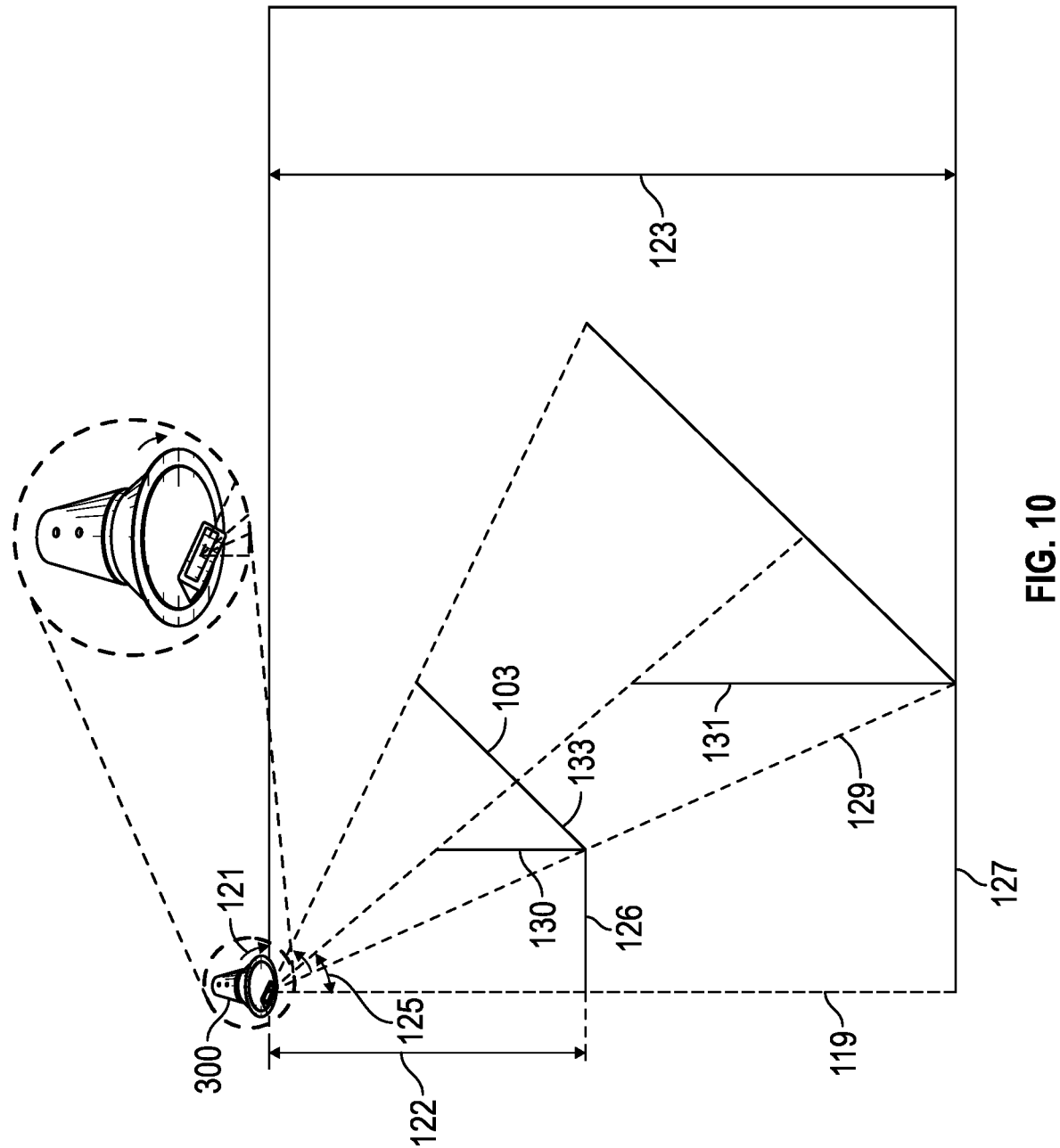
FIG. 10 illustrates aspects related to mounting configuration and measurement involving an imaging assembly, according to one or more embodiments herein.

FIG. 10 illustrates aspects of an exemplary mounting configuration as it relates to an angled imaging assembly 300 consistent with FIG. 3 and associated image sizing features, according to embodiments herein. Referring to FIG. 7, an imaging apparatus within an imaging assembly 300 at a mounting location 121 has a determined mounting angle 125 with respect to a vertical 119 aligned with the room coordinate system. In some embodiments, determination of sizes in the captured infrared/thermal image is performed in a predetermined projected image plane 103, or image coordinate system, that corresponds to a first height 122 of the imaging assembly 300 having a fixed geometrical relation with respect to the image plane 103, as defined by the mounting angle 125. The first height 122 can be considered a reference mounting height from a reference floor 126; and a reference height 130 in the vertical direction is projected to have an image 133 in the projected image plane 103.

Knowledge of the above relationship as well as the full height 123 from floor 127 to mounting location 121 enable height determination of a real world reference object 131. Here, for example, when real world object 131 has the same size as the image 133 in the imaging plane 103, the ratio between the reference height 130 and the height of the real world reference object 131 is the same as ratio between the reference mounting height 122 and the full height 123 to the floor 127 on which the object 131 stands. Thus, the reference mounting height 122 and the full height 123 can yield object height 131 based on the known ratio, here, such as based on the size and location of the image 133 and the mounting angle 125 of the camera.

Figure 11:
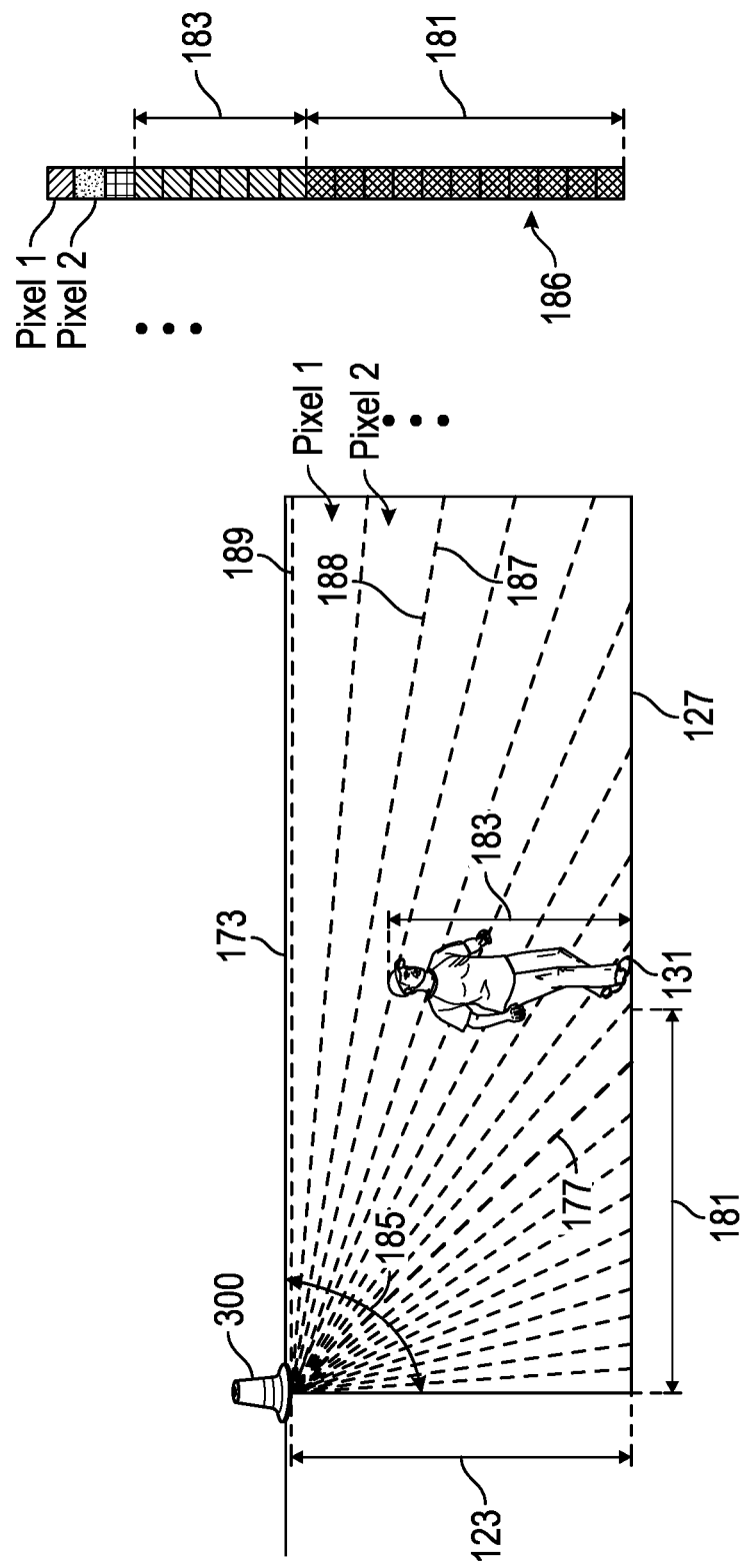
FIG. 11 illustrates geometrical relations among the mounting position of an imaging assembly, the orientation of the optical axis of an imaging apparatus housed within the imaging assembly, the field of view of the imaging apparatus, and the space within the room that can be captured in images obtained from the imaging apparatus housed within the assembly, according to one or more embodiments herein.

FIG. 11 illustrates geometrical relations among the mounting position of an imaging assembly 300 of FIG. 3, the orientation of the optical axis of an imaging apparatus housed within the imaging assembly, the field of view of the imaging apparatus, and the space within the room that can be captured in images obtained from the imaging apparatus housed within the assembly.

Within the infrared/thermal image assembly 300, the imaging apparatus may be mounted to have a predetermined orientation with respect to its enclosure (e.g., a desired alignment of its optical axis 177 with respect to the base portion 303), such that when the enclosure of the imaging assembly 300 is mounted in a position of a ceiling 173 of the room 109, the imaging apparatus 175 achieves substantial alignment with the area of interest in the room 109. This mounting of the imaging apparatus 175 with respect to the enclosure, in conjunction with the alignment of the base face constrained by positioning the enclosure of the imaging assembly 300 in a room corner 174 or room's vertical edge 119, may help ensure that the imaging apparatus 175 views the room 109 on a well-defined axis 177 with respect to walls 171 and 172 and the floor 127 of the room 109.

In some embodiments, the desired orientation of the axis 177 of an imaging apparatus 175 with respect to the enclosure depends on a number of factors, for example to best serve the imaging apparatus and application, to achieve a desired apparatus coverage or to target a particular room geometry. In one implementation, the mounting of the imaging apparatus 175 within the enclosure is arranged so that the imaging axis 177 equally bisects the angle between the two mounting walls 171 and 172 to the horizontal. In one implementation, the mounting of the imaging apparatus 175 within the enclosure is arranged so that the imaging axis 177 equally is perpendicular to the ceiling 173 of the room 109, or is tilted with respect to the vertical edge of the room.

In some instances, the imaging apparatus 175 has a field of view (capturing viewing angle) of 90 degrees or more. When such an imaging apparatus is used, a symmetrical orientation of the image apparatus (e.g., the imaging apparatus 175) fixation within the enclosure in an orthogonal room can result in substantially full room coverage or coverage of a reasonable proportion of the room.

In some instances, the assembly or assembly enclosure (hereafter "enclosure") houses two or more imaging apparatuses (e.g., imaging apparatus 175). In such instances the enclosure includes a fixation mounting for each imaging apparatus 175 which allows the optical axis 177 of each to be fixed relative to the base face. In one possible implementation, the optical axes 177 of the imaging apparatuses can be distributed evenly in a horizontal plane and/or a vertical plane.

In some instances, the optical axis 177 may have an inclination angle from the horizontal plane that is parallel to the ceiling plane 173 or the floor plane 127. The mounting of the enclosure can be performed at a height at or above a typical human's head or even in the ceiling corner 174 of a room 109, so that the imaging apparatus 175 has an optical axis 177 being oriented towards the room, containing an inclination angle relative to the horizontal plane, with the apparatus "looking down" on the room 109. The orientation marker 169 on the enclosure functions as an indicator for ensuring that the enclosure is in the correct orientation for the imaging apparatus to be facing towards the room and towards the floor 127 of the room 109.

In general, multiple imaging apparatuses can be housed within the enclosure of the imaging assembly 300, depending on the size of the field of view of the imaging apparatuses. For example, when an imaging apparatus has a field of view of 90 degrees or more is used for corner or edge mount, one imaging apparatus may be sufficient. When imaging apparatuses each having a limited field of view (e.g., 30 degrees), an array of imaging apparatuses (e.g., 3×3) can be configured to stitch together the fields of views to cover the room.

The problem of the imaging apparatus 175 (or multiple thereof) within the enclosure being visible to a person is solved by a base face which is visually opaque or translucent from the outside of the enclosure. In fact, the enclosure is manufactured of materials visually opaque or translucent from the outside of the enclosure such that imaging apparatus is not visible in public.

Such a visibly opaque surface could be an infrared-transparent material if the imaging apparatus 175 inside the enclosure detects or emits in the infrared band (e.g., as in the related applications identified above). In some implementations such a visibly opaque, but infrared-transparent surface can be made out of polymer material, such as polyethylene (PE) or polypropylene (PP). Such polymer materials appear white and non-transparent in the visual band for the human eye, but can be transparent in the infrared band. Other visually non-transparent, but infrared transparent materials include Germanium (Ge) or Silicon (Si). These materials appear in the visual band, for the human eye, "black" and visible light cannot pass through such materials due to no transmission in the visual band.

In at least some embodiments, the enclosure of the imaging apparatus 175 is configured for simplicity of mounting procedure, with the fixed, "self-aligned" viewing angle of an imaging apparatus 175 configured within the enclosure that has an orientation configured by the ceiling-mounting or corner/near corner ceiling mounting, and/or wall-mounting in a room. Thus, if the particular orientation of the imaging apparatus 175 within the enclosure is known, the angle of the field of view 185 of the imaging apparatus 175 is known, and the approximate mounting height 123 is known, the space that is monitored by the imaging apparatus can be computed to determine whether it includes the one or multiple standing subjects 131 having a height 183 and positioned with a distance 181 and an angle within the horizontal plane of the room 109 (e.g., relative to the walls 171 and 172).

On the other side, in order to provide the desired space covered by the infrared/thermal imaging assembly 300, the desired mounting height 123 can be computed from the distance 181 between the furthest subject having height 183, the orientation of the field of optical axis 177 relative to the imaging assembly 300, and the angle of the field of view 185 of the imaging apparatus 175. The orientation of the field of optical axis 177 relative to the enclosure 167, and the angle of the field of view 185 of the imaging apparatus 175 is predefined by manufacturing of enclosure 167 in one embodiment.

In some implementations, the imaging apparatus 175 inside the enclosure has, for example, about 30×20 pixels with a horizontal and vertical field of view 185 of slightly larger than 90 degrees. The imaging assembly 300 may stream the recorded footage wirelessly to a receiver (e.g., using a wireless transmitter for wireless local area network, wireless personal area network, Wi-Fi, Bluetooth, Zigbee, radio transmission, cellular communications, etc.). The low resolution of the imaging apparatus 175 provides privacy protection to occupants of the room. In such an implementation, the base plane 165 can be a white, visually non-transparent layer, made out of a thin PE-membrane, hiding the content of the enclosure and in particular the imaging apparatus 175.

The orientation of the imaging apparatus 175 inside the enclosure can be such that it is symmetric in the horizontal plane and symmetric to the vertical plane, where the horizontal plane can be defined as substantially plane parallel to the floor 127 of the room 109 and the vertical plane can be defined as substantially plane parallel to one of the mounting walls of the room. For example, the orientation of the imaging apparatus 175 inside the enclosure can be such that its optical axis 177 is 45 degrees downward relative to the back edge 166 that joins the faces 162 and 163 and have equal angles relative to the faces 162 and 163. For example, the orientation of the imaging apparatus 175 inside the enclosure can be such that its optical axis 177 is aligned in the plane that bisect the enclosure vertically (e.g., passing through the vertical edge that joins the faces 2 and 3) and have a predetermined angle (e.g., 45 degrees) relative to the vertical edge. With the known orientation of the camera preset at manufacture, its preset field of view 185 and its approximate mounting height 123, the captured image can be analyzed for the position of a subject 131 within the field of view 185 and the height 183 of the subject 131 as well as the width, as schematically shown in a cross-section 2-dimensional view of FIG. 11.

In FIG. 11, when the height 123 of the imaging assembly 300 is known, and the optical axis 177 and the field of view 185 are known from the design and manufacture of the enclosure of the imaging assembly 300, then the observable spatial position and the distance 181 between a subject or object 131 within the field of view of the apparatus 20 can be determined.

In FIG. 11, the dotted lines from the imaging assembly 300 reversely project the pixels to the floor 127 and the wall on the opposite side. The infrared/thermal radiation between adjacent dotted lines is measured by a corresponding pixel in an imaging apparatus 175 in the imaging assembly 300. Thus, the spaces between the dotted lines represent the spaces imaged by the corresponding pixels.

For example, the infrared/thermal radiation projected to the imaging assembly 300 between the dotted lines (188 and 189) is measured by pixel 1; and the infrared/thermal radiation projected to the imaging assembly 300 between the dotted lines (187 and 188) is measured by pixel 2; etc. The infrared/thermal intensity measured by the pixels 1, 2 and others form a vertical line 186 of pixels in an infrared/thermal image. The infrared/thermal image 131 of the subject or object 131 is represented by the shaded pixels 183. For the given mounting height 123 and the field of view 185 a count of pixels 181 up to the bottom of the infrared/thermal image 133 of the object 131 corresponding to a determined horizontal distance 181 between the location of the subject or object 131 and the edge 119 on which the imaging assembly 101 is mounted. The count of the shaded pixels represents the height 183 of the infrared/thermal image 133 of the subject or object 131 in the image coordinate system 139, which corresponds to the real world height of the subject or object 131 above the floor 127 of the room 109 in view of the mounting height 123. The geometrical relation can also be used in reverse direction to determine the mounting height 123 based on the real world height of the subject or object 131 and the count of the shaded pixels that represents the height 183 of the infrared/thermal image 133 of the subject or object 131 at a location identified by the count of pixels 181 below the shaded pixels.

In FIG. 11, the one-dimensional vertical pixel row 186 shows how the subject 131 in the room 109 appears in the infrared/thermal image captured by the imaging assembly 101. The radiation from the subject 131 causes the shaded pixels to be measured to have a temperate significantly different from the other areas that are measured by the non-shaded pixels. The non-shaded pixels represented the portion of the room measured at the room temperature; and the shaded pixels represented the elevated surface temperate of the subject 131 over the room temperature.

In FIG. 11, the vertical row of pixels 186 are identified as with "Pixel 1", "Pixel 2", etc., which correspond to the imaged spaces marked corresponding with "Pixel 1", "Pixel 2", etc.

Assuming the subject 131 is standing vertically within the room 109, his or her height 183 and position 181 can be determined by trigonometric relations. Analogue example is valid for the horizontal dimension, which allows the determination of the subject's or object's position within the horizontal dimension and its width. This is valid for any object having a temperature different from the room temperature in case of imaging in thermal infrared.

For example, hot-spots or cold-spots can be allocated by knowing their position and their relative size, in addition to its relative temperature. Hot-spots could include hazardous items such as for example an iron that was accidently forgotten to be turned off by a user and left was unattended and can be a potential fire or safety hazard, or cold-spots could include an open window when very cold air is streaming into the room that was forgotten to be closed by a person. Many cold-spots and hot-spots can be detected by a low resolution infrared/thermal imaging apparatus. Accordingly, three-dimensional information of the viewing scenery can be reconstructed of the recorded image of the imaging assembly 300.

The example of FIG. 11 is simplified to a cross sectional, two-dimensional case with one vertical pixel row 186 of 20 pixels, representing the vertical imaging capacity of the imaging assembly 300 in such an example. The imaging apparatus has preferably a viewing capacity of an array of rows, equivalent to a matrix of pixels of, for example, 30 pixels in the horizontal direction by 20 pixels in the vertical direction.

Optionally, additional functions may be integrated within the enclosure of the imaging assembly 101, such as a decorative surface on the visible side of the base face 165, lighting, Wi-Fi access point/repeater, etc.

Optionally, any part of the imaging assembly disposed within its enclosure, such as one or the multiplicity of the imaging apparatus 175, a battery, any wireless module, the electronic board, the LEDs, the speakers, etc. can be designed to be exchangeable or replaceable within the enclosure, while the enclosure can be permanently fixated and mounted on the walls without the need of demounting the entire assembly. For example, a battery module can be replaceable; and other replaceable modules can be similarly configured for the imaging apparatus 175, an optional wireless module, etc.

At least some embodiments disclosed herein provide a user-friendly way to determine the installation configuration of an infrared/thermal imaging assembly, based on the infrared/thermal images captured at the time of the calibration of the infrared/thermal imaging assembly in an infrared/thermal imaging system and user inputs provided in connection with the infrared/thermal images. The user inputs train the infrared/thermal imaging system to gain knowledge about the environment in which the infrared/thermal imaging assembly is installed and configured to monitor. The configuration parameters and the knowledge about the environment are used subsequently to interpret the images obtained at a time of monitoring service and generate monitoring outputs, such as identifying the presence, location, and/or activities of humans, telling adults, children, and pets apart, etc.

For example, the user may provide the height of a person (e.g., the user) detectable in the infrared/thermal images during the installation/calibration of the infrared/thermal imaging system to allow the system to compute a mounting height of the infrared/thermal imaging assembly. Other user inputs may include an indication of the time instance when the user is at a point of interest (POI) (e.g., room corner, door), identification of a POI, etc., to allow the system to learn the locations of the POI in the imaging coordinate system, where the POI may not be visible or recognizable from the infrared/thermal image directly.

During the installation/calibration, the system may instruct the user to perform activities, such as walking away or to the camera, going to a point of interest, walking along a path way in an area monitored by the camera, walking in an area heavy for foot traffic, etc. The user activities generate infrared/thermal images from which the system learns the geographical configuration of the monitored environment.

Based on the user inputs and/or the infrared/thermal images collected during the installation/calibration, the system computes configuration parameters, such as the mounting height of the infrared/thermal imaging assembly, a ratio or mapping between a size in the image and a size of a person/object in the monitored area, and the identification of POIs in images captured by the infrared/thermal camera. The system bookmarks the locations, paths, and/or areas of interest as knowledge about the environment in which the infrared/thermal imaging assembly is installed and configured to monitor.

For example, a mobile application is configured in one embodiment to ask the user to enter the height of the user captured in an infrared/thermal image presented on the mobile application. Once the mobile application detects the user in the image, the application may instruct the user to perform an act, such as entering the height of the user, or going to a point of interest, such as a corner of the room, a door or window of the room, etc. The mobile application (or a remote server) extracts location and/or size data from the infrared/thermal images of the user performing the act and correlate the instruction and/or optional input from the user to determine configuration parameters, such as the mounting height of the infrared/thermal camera, the location of the point of interest in the infrared/thermal image coordinate system, a location mapping between the infrared/thermal image coordinate system and a coordinate system aligned with the room, a size mapping between the object sizes measured in the infrared/thermal image coordinate system and the real world object sizes in the room coordinate system.

Figure 12:
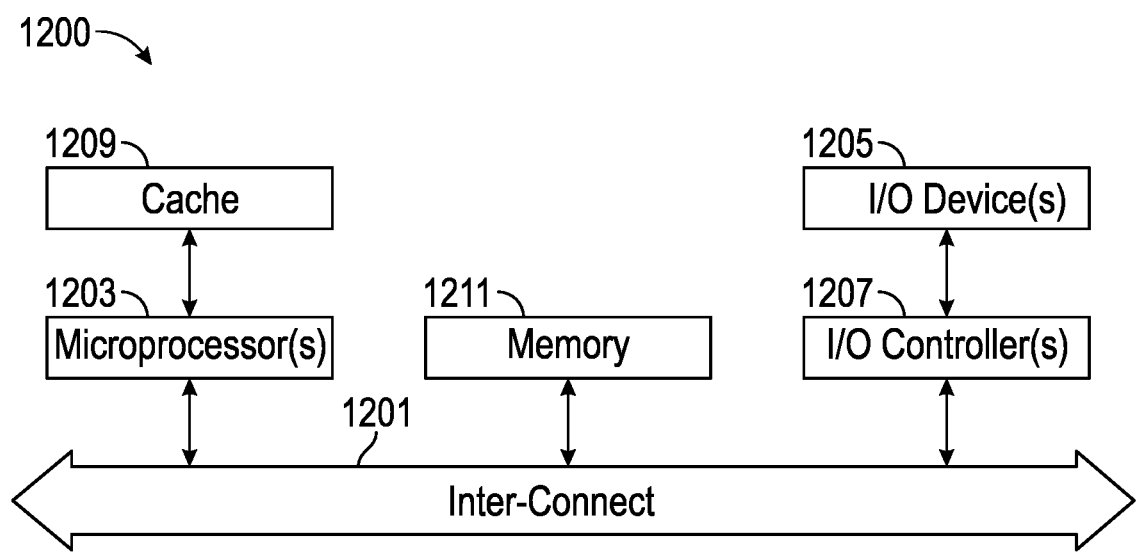
FIG. 12 illustrates a data processing system that can be used to implement some components, according to one or more embodiments of the present application.

FIG. 12 shows a data processing system that can be used to implement some components of embodiments of the present application. While FIG. 12 illustrates various components of a computer system, it is not intended to represent any particular architecture or manner of interconnecting the components. Other systems that have fewer or more components than those shown in FIG. 12 can also be used.

In FIG. 12, the data processing system 1200 includes an inter-connect 1201 (e.g., bus and system core logic), which interconnects a microprocessor(s) 1203 and memory 1211. The microprocessor 1203 is coupled to cache memory 1209 in the example of FIG. 12.

In FIG. 12, the inter-connect 1201 interconnects the microprocessor(s) 1203 and the memory 1211 together and also interconnects them to input/output (I/O) device(s) 1205 via I/O controller(s) 1207. I/O devices 1205 may include a display device and/or peripheral devices, such as mice, keyboards, modems, network interfaces, printers, scanners, video cameras and other devices known in the art. When the data processing system is a server system, some of the I/O devices 1205, such as printers, scanners, mice, and/or keyboards, are optional.

The inter-connect 1201 includes one or more buses connected to one another through various bridges, controllers and/or adapters. For example, the I/O controllers 1207 include a universal serial bus (USB) adapter for controlling USB peripherals, and/or an IEEE-1394 bus adapter for controlling IEEE-1394 peripherals.

The memory 1211 includes one or more of: read only memory (ROM), volatile random access memory (RAM), and non-volatile memory, such as hard drive, flash memory, etc.

Volatile RAM is typically implemented as dynamic RAM (DRAM) which requires power continually in order to refresh or maintain the data in the memory. Non-volatile memory is typically a magnetic hard drive, a magnetic optical drive, an optical drive (e.g., a DVD RAM), or other type of memory system which maintains data even after power is removed from the system. The non-volatile memory may also be a random access memory.

The non-volatile memory can be a local device coupled directly to the rest of the components in the data processing system. A non-volatile memory that is remote from the system, such as a network storage device coupled to the data processing system through a network interface such as a modem or ethernet interface, can also be used.

In this description, some functions and operations are described as being performed by or caused by software code to simplify description. However, such expressions are also used to specify that the functions result from execution of the code/instructions by a processor, such as a microprocessor.

Alternatively, or in combination, the functions and operations as described here can be implemented using special purpose circuitry, with or without software instructions, such as using application-specific integrated circuit (ASIC) or field-programmable gate array (FPGA). Embodiments can be implemented using hardwired circuitry without software instructions, or in combination with software instructions. Thus, the techniques are limited neither to any specific combination of hardware circuitry and software, nor to any particular source for the instructions executed by the data processing system.

While one embodiment can be implemented in fully functioning computers and computer systems, various embodiments are capable of being distributed as a computing product in a variety of forms and are capable of being applied regardless of the particular type of machine or computer-readable media used to actually effect the distribution.

At least some aspects disclosed can be embodied, at least in part, in software. That is, the techniques may be carried out in a computer system or other data processing system in response to its processor, such as a microprocessor, executing sequences of instructions contained in a memory, such as ROM, volatile RAM, non-volatile memory, cache or a remote storage device.

Routines executed to implement the embodiments may be implemented as part of an operating system or a specific application, component, program, object, module or sequence of instructions referred to as "computer programs." The computer programs typically include one or more instructions set at various times in various memory and storage devices in a computer, and that, when read and executed by one or more processors in a computer, cause the computer to perform operations necessary to execute elements involving the various aspects.

A machine readable medium can be used to store software and data which when executed by a data processing system causes the system to perform various methods. The executable software and data may be stored in various places including for example ROM, volatile RAM, non-volatile memory and/or cache. Portions of this software and/or data may be stored in any one of these storage devices. Further, the data and instructions can be obtained from centralized servers or peer to peer networks. Different portions of the data and instructions can be obtained from different centralized servers and/or peer to peer networks at different times and in different communication sessions or in a same communication session. The data and instructions can be obtained in entirety prior to the execution of the applications. Alternatively, portions of the data and instructions can be obtained dynamically, just in time, when needed for execution. Thus, it is not required that the data and instructions be on a machine readable medium in entirety at a particular instance of time.

Examples of computer-readable media include but are not limited to recordable and non-recordable type media such as volatile and non-volatile memory devices, read only memory (ROM), random access memory (RAM), flash memory devices, floppy and other removable disks, magnetic disk storage media, optical storage media (e.g., compact disk read-only memory (CD ROM), digital versatile disks (DVDs), etc.), among others. The computer-readable media may store the instructions.

The instructions may also be embodied in digital and analog communication links for electrical, optical, acoustical or other forms of propagated signals, such as carrier waves, infrared signals, digital signals, etc. However, propagated signals, such as carrier waves, infrared signals, digital signals, etc. are not tangible machine readable medium and are not configured to store instructions.

In general, a machine readable medium includes any mechanism that provides (i.e., stores and/or transmits) information in a form accessible by a machine (e.g., a computer, network device, personal digital assistant, manufacturing tool, any device with a set of one or more processors, etc.).

In various embodiments, hardwired circuitry may be used in combination with software instructions to implement the techniques. Thus, the techniques are neither limited to any specific combination of hardware circuitry and software nor to any particular source for the instructions executed by the data processing system.

OTHER ASPECTS

The description and drawings are illustrative and are not to be construed as limiting. The present disclosure is illustrative of inventive features to enable a person skilled in the art to make and use the techniques. Various features, as described herein, should be used in compliance with all current and future rules, laws and regulations related to privacy, security, permission, consent, authorization, and others. Numerous specific details are described to provide a thorough understanding. However, in certain instances, well known or conventional details are not described in order to avoid obscuring the description. References to one or an embodiment in the present disclosure are not necessarily references to the same embodiment; and, such references mean at least one.

The use of headings herein is merely provided for ease of reference, and shall not be interpreted in any way to limit this disclosure or the following claims.

Reference to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, and are not necessarily all referring to separate or alternative embodiments mutually exclusive of other embodiments. Moreover, various features are described which may be exhibited by one embodiment and not by others. Similarly, various requirements are described which may be requirements for one embodiment but not other embodiments. Unless excluded by explicit description and/or apparent incompatibility, any combination of various features described in this description is also included here. For example, the features described above in connection with "in one embodiment" or "in some embodiments" can be all optionally included in one implementation, except where the dependency of certain features on other features, as apparent from the description, may limit the options of excluding selected features from the implementation, and incompatibility of certain features with other features, as apparent from the description, may limit the options of including selected features together in the implementation.

In the foregoing specification, the disclosure has been described with reference to specific exemplary embodiments thereof. It will be evident that various modifications may be made thereto without departing from the broader spirit and scope as set forth in the following claims. The specification and drawings are, accordingly, to be regarded in an illustrative sense rather than a restrictive sense.

What is claimed is:

1. A system, comprising:
    an enclosure having a cover portion that is opaque or translucent to visible light as viewed from outside of the enclosure, wherein the cover portion is transparent to infrared radiation;
    an infrared sensor configured in the enclosure and behind the cover portion to be substantially invisible from the outside of the enclosure, the infrared sensor configured with a predetermined imaging direction through the cover portion with respect to the enclosure; and a processor configured to process images captured by the infrared sensor to extract information.

2. The system of claim 1, wherein the information includes size data, or location data, or both.

3. The system of claim 2, wherein the enclosure includes an orientation marker, visible from the outside of the enclosure and configured to identify the imaging direction.

4. The system of claim 3, wherein the cover portion is a base portion of the enclosure and is circular in shape.

5. The system of claim 4, wherein the enclosure is configured to have a size and a shape adapted to be installed in a ceiling cavity for a downlight.

6. The system of claim 4, wherein the enclosure is configured to have a size and a shape of a downlight.

7. The system of claim 4, wherein the enclosure includes a wall region having a substantially conical or frustoconical structure.

8. The system of claim 7, wherein the enclosure further includes an end portion that is distal to the base portion; and the end portion includes a threaded connector configured to mate with a light socket.

9. The system of claim 8, wherein a circuitry configured within the enclosure, including the infrared sensor, is powered by electricity supplied via the light socket, when the end portion is connected to the light socket.

10. The system of claim 9, further comprising:
one or more light emitting diodes (LEDs) configured to provide a cone-shaped beam under the base portion.

11. The system of claim 10, further comprising:
a speaker configured within the enclosure.

12. The system of claim 4, wherein the cover portion includes a film, a solid plate, an infrared lens, or an optical element, or any combination thereof.

13. The system of claim 4, wherein the processor is configured within the enclosure.

14. The system of claim 4, further comprising:
one or more data transmission modules configured within the enclosure to communicate the images captured by the infrared sensor.

15. The system of claim 4, wherein the base portion is made of:
polyethylene;
polypropylene;
Germanium; and
Silicon.

16. A method, comprising:
capturing, using an infrared sensor configured behind a cover portion of an enclosure, images in a predetermined imaging direction through the cover portion with respect to the enclosure, the cover portion being opaque or translucent to visible light as viewed from outside of the enclosure, wherein the cover portion is transparent to infrared radiation, and wherein the infrared sensor being substantially invisible from the outside of the enclosure; and processing, using a processor in communication with the infrared sensor, the images captured by the infrared sensor to extract information.

17. The method of claim 16, wherein the information includes size data, or location data, or both.

18. The method of claim 17, further comprising:
installing, based on an orientation marker configured on the enclosure and visible from the outside of the enclosure, the enclosure to have the predetermined imaging direction in alignment with a direction to monitor an area using the infrared sensor.

19. An apparatus, comprising:
an enclosure of a downlight, the enclosure having a cover portion that is opaque or translucent to visible light as viewed from outside of the enclosure, wherein the cover portion is transparent to infrared radiation; and an infrared sensor configured in the enclosure and behind the cover portion to be substantially invisible from the outside of the enclosure, the infrared sensor configured with a predetermined imaging direction through the cover portion with respect to the enclosure.

20. The apparatus of claim 19, further comprising:
a processor in communication with the infrared sensor and configured to process images captured by the infrared sensor to extract information.

* * * * *